(12) United States Patent
Gray et al.

(10) Patent No.: US 8,898,652 B2
(45) Date of Patent: Nov. 25, 2014

(54) CACHE METADATA FOR ACCELERATING SOFTWARE TRANSACTIONAL MEMORY

(75) Inventors: Jan Gray, Bellevue, WA (US); Timothy L. Harris, Cambridge (GB); James Larus, Mercer Island, WA (US); Burton Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1724 days.

(21) Appl. No.: 11/811,033

(22) Filed: Jun. 8, 2007

(65) Prior Publication Data

US 2007/0245128 A1 Oct. 18, 2007

Related U.S. Application Data

(63) Continuation-in-part of application No. 11/389,451, filed on Mar. 23, 2006.

(51) Int. Cl.
*G06F 9/45* (2006.01)
*G06F 9/30* (2006.01)
*G06F 9/46* (2006.01)

(52) U.S. Cl.
CPC .......... *G06F 9/3004* (2013.01); *G06F 9/30087* (2013.01); *G06F 9/467* (2013.01); *G06F 9/30003* (2013.01)
USPC ........................................................ 717/149

(58) Field of Classification Search
None
See application file for complete search history.

(56) References Cited

U.S. PATENT DOCUMENTS

| 5,428,761 | A |   | 6/1995 | Herlihy et al. |
|---|---|---|---|---|
| 5,864,849 | A | * | 1/1999 | Bohannon et al. ............ 707/648 |
| 5,940,838 | A |   | 8/1999 | Schmuck et al. |
| 6,081,883 | A |   | 6/2000 | Popelka et al. |
| 6,115,715 | A | * | 9/2000 | Traversat et al. ............. 717/121 |
| 6,230,311 | B1 | * | 5/2001 | Gerard et al. ................. 717/108 |
| 6,266,743 | B1 | * | 7/2001 | Carpenter et al. ............ 711/143 |
| 6,295,580 | B1 | * | 9/2001 | Sturges et al. ................ 711/129 |
| 6,327,175 | B1 |   | 12/2001 | Manapat et al. |

(Continued)

FOREIGN PATENT DOCUMENTS

| WO | WO 2004/042583 | 5/2004 |
|---|---|---|
| WO | 2007092422 | 8/2007 |

OTHER PUBLICATIONS

Chuang et al. "Unbounded Page-Based Transactional Memory", 2006, ACM, ASPLOS'06.*

(Continued)

*Primary Examiner* — Jason Mitchell
(74) *Attorney, Agent, or Firm* — Kevin Sullivan; Kate Drakos; Micky Minhas

(57) ABSTRACT

Various technologies and techniques are disclosed for providing a hardware accelerated software transactional memory application. The software transactional memory application has access to metadata in a cache of a central processing unit that can be used to improve the operation of the STM system. For example, open read barrier filtering is provided that uses an opened-for-read bit that is contained in the metadata to avoid redundant open read processing. Similarly, redundant read log validation can be avoided using the metadata. For example, upon entering commit processing for a particular transaction, a get-evictions instruction in an instruction set architecture of the central processing unit is invoked. A retry operation can be optimized using the metadata. The particular transaction is aborted at a current point and put to sleep. The corresponding cache line metadata in the metadata are marked appropriately to efficiently detect a write by another CPU.

19 Claims, 22 Drawing Sheets

(56) References Cited

U.S. PATENT DOCUMENTS

| | | | |
|---|---|---|---|
| 6,449,623 B1* | 9/2002 | Bohannon et al. ............... 1/1 |
| 6,571,259 B1 | 5/2003 | Zheng et al. |
| 6,658,539 B2 | 12/2003 | Arimilli et al. |
| 6,754,773 B2 | 6/2004 | Ulrich et al. |
| 6,775,727 B2 | 8/2004 | Moyer |
| 6,848,109 B1* | 1/2005 | Kuhn ............................ 719/315 |
| 6,880,045 B2 | 4/2005 | Pong et al. |
| 7,114,036 B2 | 9/2006 | DeWitt, Jr. et al. |
| 7,181,608 B2 | 2/2007 | Fallon et al. |
| 7,188,216 B1 | 3/2007 | Rajkumar et al. |
| 7,206,903 B1* | 4/2007 | Moir et al. ..................... 711/145 |
| 7,496,726 B1* | 2/2009 | Nussbaum et al. ........... 711/163 |
| 7,822,727 B1* | 10/2010 | Shaughnessy ................ 707/703 |
| 8,001,538 B2 | 8/2011 | Gray et al. |
| 8,225,297 B2 | 7/2012 | Gray et al. |
| 2002/0083353 A1 | 6/2002 | Orenstein et al. ............ 713/320 |
| 2002/0087614 A1 | 7/2002 | Kocev et al. |
| 2002/0091718 A1* | 7/2002 | Bohannon et al. ........... 707/202 |
| 2004/0015642 A1 | 1/2004 | Moir |
| 2004/0025169 A1* | 2/2004 | Wiser et al. ................... 719/315 |
| 2004/0133769 A1 | 7/2004 | Chaudhry et al. |
| 2004/0162968 A1 | 8/2004 | Tremblay et al. |
| 2004/0163082 A1* | 8/2004 | Tremblay et al. ............. 718/101 |
| 2004/0187116 A1* | 9/2004 | Tremblay et al. ............. 718/100 |
| 2004/0187123 A1* | 9/2004 | Tremblay et al. ............. 718/100 |
| 2005/0060383 A1* | 3/2005 | Lovett et al. ................... 709/213 |
| 2005/0060559 A1* | 3/2005 | McKenney ................... 713/190 |
| 2005/0086446 A1 | 4/2005 | McKenney et al. |
| 2005/0120179 A1 | 6/2005 | Akkary et al. |
| 2005/0138289 A1* | 6/2005 | Royer et al. ................... 711/118 |
| 2005/0210198 A1 | 9/2005 | Dimpsey et al. |
| 2006/0010227 A1 | 1/2006 | Atluri |
| 2006/0085591 A1 | 4/2006 | Kumar et al. |
| 2006/0161740 A1 | 7/2006 | Kottapalli et al. |
| 2007/0050548 A1* | 3/2007 | Bali et al. ...................... 711/118 |
| 2007/0073528 A1 | 3/2007 | Watt et al. |
| 2007/0143287 A1 | 6/2007 | Adl-tabatabai et al. |
| 2007/0186056 A1* | 8/2007 | Saha et al. ..................... 711/144 |
| 2007/0239942 A1 | 10/2007 | Rajwar et al. |
| 2007/0245099 A1 | 10/2007 | Gray et al. |
| 2007/0245128 A1 | 10/2007 | Gray et al. |
| 2007/0260942 A1 | 11/2007 | Rajwar et al. |
| 2008/0010417 A1 | 1/2008 | Zeffer et al. |
| 2008/0046661 A1* | 2/2008 | Saha et al. ..................... 711/144 |
| 2008/0162990 A1 | 7/2008 | Wang et al. |
| 2008/0163220 A1 | 7/2008 | Wang et al. |

OTHER PUBLICATIONS

Rajwar, "Virtualizing Transactional Memory", 2005, IEEE, Proceedings of the 32nd International Symposium on Computer Architecture (ISCA '05).*
Saha, Bratin, et al. "Architectural Support for Software Transactional Memory." The 39th Annual IEEE/ACM International Symposium on Microarchitecture (MICRO'06). 12 pages. 2006.
Marathe, Virendra J., et al. "Lowering the Overhead of Nonblocking Software Transactional Memory." 11 pages. May 17, 2006.
Adl-Tabatabai, Ali-Reza, et al. "Unlocking Concurrency." ACM QUEUE. 10 pages. Dec./Jan. 2006-2007
Moore, Kevin, et al. "LogTM: Log-based Transactional Memory." 12th Annual International Symposium on High Performance Computer Architecture (HPCA-12). 12 pages. Feb. 2006.
Harris, Tim, et al. "Optimizing Memory Transactions." 12 pages. 2006.
Shriraman, Arrvindh, et al., "Hardware Acceleration of Software Transactional Memory," the First ACM SIGPLAN Workshop on Languages, Compilers, and Hardware Support for Transactional Computing, held in conjunction with PLDI, Ottawa, Ontario, Canada, pp. 1-10, (Jun. 2006).
PCT International Search Report for International Application No. PCT/US2008/065378 mailed Dec. 11, 2008 (6 pages).
PCT Written Opinion for International Application No. PCT/US2008/065378 mailed Dec. 11, 2008 (4 pages).
European Search Report dated Sep. 4, 2012, European Patent Application No. 08 769 911.2, 14 pages.
International Search Report and Written Opinion Received for PCT Application No. PCT/US2008/065370, mailed on Oct. 31, 2008, 6 pages.
International Search Report and Written Opinion Received for PCT Application No. PCT/US2008/065376, mailed on Dec. 31, 2008, 7 pages.
International Search Report and Written Opinion for International Application No. PCT/US2008/065381, Jan. 16, 2009, 11 pages.
Search Report for Taiwan issued in Patent Application No. 097117848 (English Translation), dated Oct. 15, 2013, 1 page.

* cited by examiner

FIG 3 Exemplary Private Data Cache Enhanced with CLMD and VAMD Cache Metadata

170

| LINE # | LP# | ADDRESS | MESI | | | CACHE DATA | | | | |
|---|---|---|---|---|---|---|---|---|---|---|
| 0 | | A | MESI[A] | A[0] | ... | A[7] | A[8] | A[15] | ... | A[56] | A[63] |
| | LP0 | clmd | | | | vamd | | | | |
| | LP1 | clmd | | | | vamd | | | | |
| | LP2 | clmd | | | | vamd | | | | |
| | LP3 | clmd | | | | vamd | | | | |
| 1 | | B | MESI[B] | B[0] | ... | B[7] | B[8] | B[15] | ... | B[56] | B[63] |
| | LP0 | clmd | | | | vamd | | | | |
| | LP1 | clmd | | | | vamd | | | | |
| | LP2 | clmd | | | | vamd | | | | |
| | LP3 | clmd | | | | vamd | | | | |
| ... | | ... | | | | ... | | | | |
| 1023 | | ZZ | MESI[ZZ] | ZZ[0] | ... | ZZ[7] | ZZ[8] | ZZ[15] | ... | ZZ[56] | ZZ[63] |
| | LP0 | clmd | | | | vamd | | | | |
| | LP1 | clmd | | | | vamd | | | | |
| | LP2 | clmd | | | | vamd | | | | |
| | LP3 | clmd | | | | vamd | | | | |

Example Of New State Per Logical Processor Per Cache: Cache Metadata Control Registers (CMD)

```
struct CMD {                              // cache metadata
    CLMD clmd_evictions;                  // or'd line evictions+invals summary
    CLMD clmd_specwritesmask;             // subset of CLMD bits that indicate
                                          // speculative writes
    CLMD clmd_default;                    // default line load CLMD value
    VAMD vamd_default;                    // default line load VAMD value
                                          // (copied to every quadwords' VAMDs)
    void (*clmd_eviction_handler)();      //eviction handler vector
    CLMD clmd_eviction_handler_mask;      //eviction handler event mask
}
struct CACHE += {
    CMD cmds[NLPS];
}
```

FIG. 4

CMD INSTRUCTIONS 330

| INSTRUCTION | |
|---|---|
| INSTRUCTION: SET_VAMD_DEFAULT | 332 |
| INSTRUCTION: GET_VAMD_DEFAULT | 334 |
| INSTRUCTION: SET_CLMD_DEFAULT | 336 |
| INSTRUCTION: GET_CLMD_DEFAULT | 338 |
| INSTRUCTION: SET_CLMD_SPEC_WRITES | 340 |
| INSTRUCTION: GET_CLMD_SPEC_WRITES | 342 |
| INSTRUCTION: SET_CLMD_EVICTIONS | 344 |
| INSTRUCTION: GET_CLMD_EVICTIONS | 346 |
| INSTRUCTION: CONDITIONAL_TEST_EVICTIONS | 348 |
| INSTRUCTION: CONDITIONAL_DISCARD | 349 |
| INSTRUCTION: GET_CACHE_LINE_SIZE | 350 |
| INSTRUCTION: GET_VAMD_BITS | 352 |
| INSTRUCTION: GET_VAMD_STRIDE | 354 |
| INSTRUCTION: GET_CLMD_BITS | 356 |

CACHE METADATA FOR ACCELERATING SOFTWARE TRANSACTIONAL MEMORY

CROSS-REFERENCE TO RELATED APPLICATIONS

This is a continuation-in-part application of application Ser. No. 11/389,451, filed Mar. 23, 2006, which claims the benefit of U.S. Provisional Application No. 60/748,386, filed Dec. 7, 2005.

BACKGROUND

A CPU cache is a computer hardware mechanism used by the central processing unit of a computer to reduce the average time to access memory. A cache is a small, fast memory that retains copies of the data from recently used main memory locations. If a subsequent memory access is to a memory address that has been retained in the cache, the memory access is satisfied using the cache memory. Thus, the more accesses that are performed from cached memory locations, the lower the average memory access time, and the faster the application program runs.

Cache memory is subdivided into cache lines. Each cache line has a copy of some fixed-size, contiguous range of bytes of main memory. Each cache line also has an address tag and other state that identifies whether the cache line is presently valid and if so what addressed range of data are retained in the cache line. Cache lines are of a fixed size, typically 32 to 256 bytes, that depends upon the hardware design. When a CPU performs a read or write memory access to a data at a given address in main memory, it also checks whether that address is contained in its cache, in particular, if the cache contains a cache line which is valid and whose address tag matches the memory address of the access. If so, then a cache hit occurs, and the CPU accesses the data in the cache line. Otherwise, a cache miss occurs and the CPU proceeds down the slower path of accessing the data elsewhere, and recording a copy of the data in a cache line in the CPU cache. Since a cache is of fixed size, to retain new data in a cache line, it may be necessary to evict (invalidate) data that may have been previously held in that cache line.

Software application programs execute a sequence of hardware instructions to effect a computation. Such instructions may perform arithmetic operations, may alter the program control flow sequence of subsequent instructions, may read or write (collectively, access) data at specific memory addresses, or perform other operations. When a CPU cache is used with a CPU, its presence, and any information about which addresses are currently cached, and any hardware processes of checking, validating, and invalidating cache lines, is typically invisible and inaccessible to software programs, except that programs usually execute faster.

Modern computers may have a plurality of layers of caches. For example, a small, fast level one cache (L1$) may quickly service most memory accesses; but on an L1$ miss, a larger, slower level two cache (L2$) may be accessed. Only upon a memory access that misses both the L1$ and L2$ would the access be performed to the relatively very slow main memory.

Modern computers may also be multiprocessors, which have a plurality of CPUs. In a shared memory multiprocessor, each CPU may access the same shared memory, so one CPU may write to shared memory and later another CPU may read the data written by the first. Each CPU may have one or more layers of cache for its exclusive use (private cache) as well as one or more layers of caches shared with other CPUs (shared cache). In the presence of multiple CPUs with caches, multiprocessors implement cache coherence to transparently provide the multiple threads of execution in the software program with the illusion that all memory accesses are to a single common shared main memory. Here the simple notion that a given cache line is valid is replaced with more elaborate cache line validity states, state machines, and signaling protocols called cache coherence protocols. Sometimes an access in one CPU (such as a write) must invalidate a cache line in other CPUs.

It is also possible to factor and share hardware resources in a multiprocessor so as to share some, or nearly all, of the duplicated hardware resources between multiple CPUs. In an extreme case, a logical plurality of CPUs can be implemented in hardware in a time multiplexed fashion upon a single CPU core, by providing a plurality of copies of all the processor state and registers, called hardware thread contexts, in a single CPU. This is known as a multithreaded CPU core. For example, a single CPU core with four distinct thread contexts, e.g. four copies of its program counter, general purpose registers, and special purpose registers, nonetheless appears to application software and operating system software as four logical processors (LPs), indistinguishable in behavior, if not performance, from a multiprocessor comprising four separate CPU cores.

Over time, computer hardware has become faster and more powerful. Today's multiprocessors provide multiple CPU cores that can operate in parallel. Programmers would like different pieces of a program to execute in parallel on these multiple cores, to take advantage of the performance improvements that can be achieved. However, parallel programming is quite difficult for the average programmer using the software development techniques of today, and thus system implementers are developing new programming models that can be used to better write parallel programs. Some of these new programming models are following a transactional memory approach, which uses a transaction abstraction to help coordinate parallel threads' access to shared memory. Transactions do not automatically provide parallelism per se, but they do shift some of the burden of coordinating parallel tasks to other parts of the system, such as the compiler or runtime.

SUMMARY

Various technologies and techniques are disclosed for providing software accessible metadata in a cache of a central processing unit. The metadata state can include at least some bits of state for each quantum of addressed data, at least some state for each cache line, and at least some state for the cache overall. Additional instructions in the central processing unit are provided for interacting with this metadata. New side effects are introduced into operations of the central processing unit and cache by presence of the metadata and the additional instructions. The metadata can be accessed by at least one software program to facilitate an operation of the software program.

In one implementation, a bounded transactional memory application is provided that accesses cache metadata in a cache of a central processing unit. When performing a transactional read from the bounded transactional memory application, a cache line metadata transaction-read bit is set. When performing a transactional write from the bounded transactional memory application, a cache line metadata transaction-write bit is set and a conditional store is performed. At commit time, if any lines marked with the transaction-read bit or the transaction-write bit were evicted or invalidated, all speculatively written lines are discarded. The application can also interrogate a cache line metadata eviction summary to determine whether a transaction is doomed and then take an appropriate action.

In another implementation, a hardware accelerated software transactional memory (HASTM) application is provided. The software transactional memory application has access to metadata in a cache of a central processing unit that can be used to improve the operation of the STM system, in particular to accelerate some of the most time consuming operations in the software transactional memory operation. For example, open read barrier filtering is provided that uses an opened-for-read bit that is contained in the cache metadata to quickly filter (test and set) whether a given transactional memory datum has already received the expensive software bookkeeping it requires. If so, the redundant 'open for read' software bookkeeping is safely skipped. Read log validation is also accelerated using metadata. As a transaction runs, the HASTM software sets a read-set bit in the cache line metadata for each accessed datum, accumulating in the cache a 'read set' of metadata state representing the set of data the transaction read. This cache metadata is retained alongside its cached data unless evicted or unless invalidated when some other CPU writes to data in this CPU's read set. At transaction commit time, or earlier, the application may interrogate the cache line metadata eviction summary; if no lines were evicted, the CPU's read set is intact, so software read set validation is unnecessary and can be skipped. This same read-set cache line metadata also accelerates the retry facility of a software transactional memory system. If an application uses a transaction retry statement to roll back its transaction and then await a change in its read set, the HASTM software need only establish a software handler vector to await invalidation of a read-set bit of cache line metadata. Then when another CPU writes some data that is in the application's read set, the corresponding cache line (and hence its read-set bit in its cache line metadata) will be invalidated, triggering a jump to a software handler that concludes the 'retry' action and resumes (restarts) the transaction.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a diagram illustrating exemplary hardware structure that implements additional metadata per logical processor per cache line for the system of FIG. 1.

FIG. 4 is a diagram illustrating exemplary hardware structure that implements additional metadata per logical processor per cache for the system of FIG. 1.

FIG. 9 is a diagrammatic view of exemplary CMD instructions for the central processing unit of FIG. 5.

DETAILED DESCRIPTION

Figure 1:
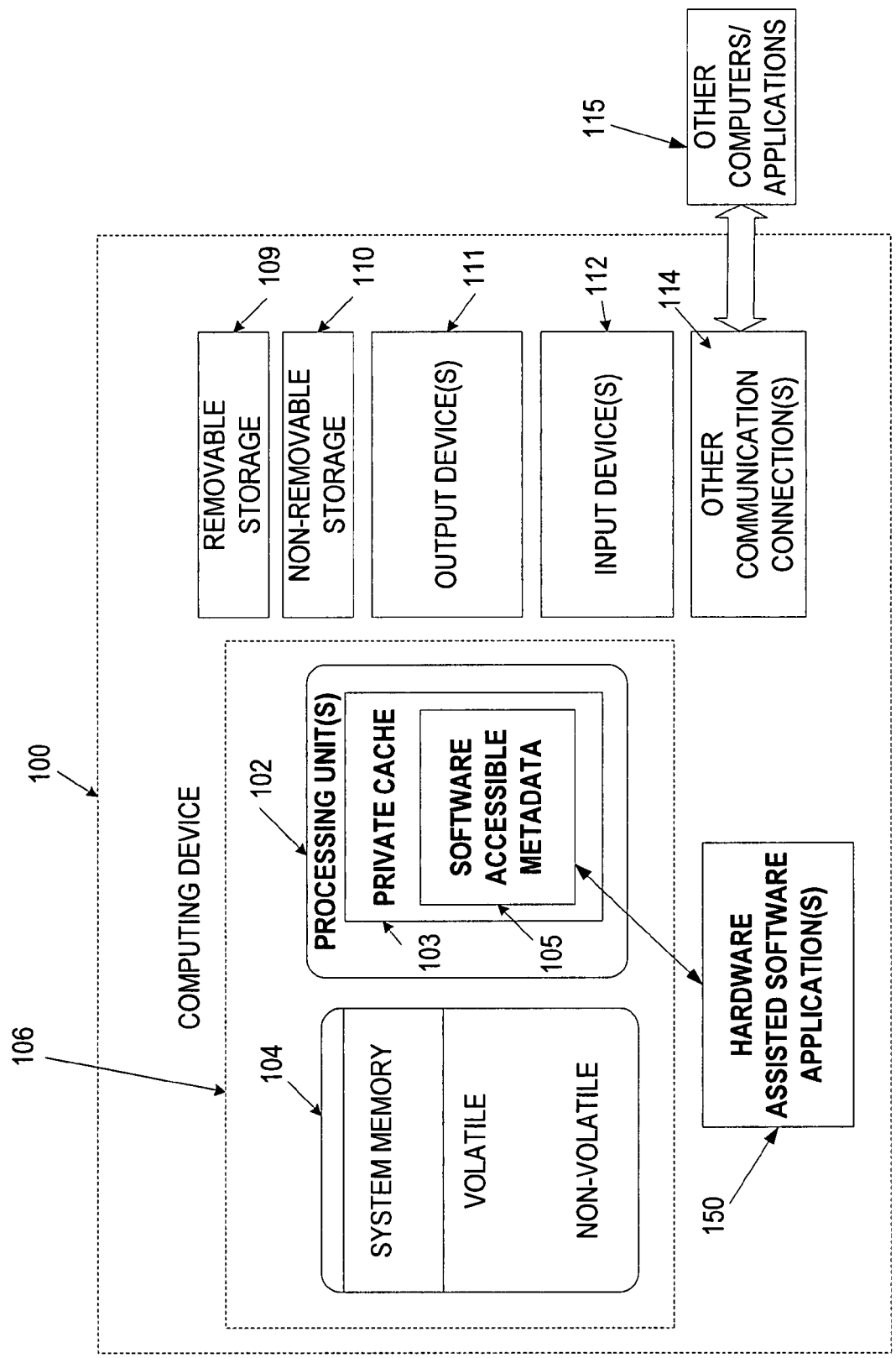
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a system that has a central processing unit that uses cache metadata on the CPU cache for improving the operation of one or more software programs. As shown in FIG. 1, an exemplary computer system to use for implementing one or more parts of the system includes a computing device, such as computing device 100. In its most basic configuration, computing device 100 typically includes at least one processing unit 102 and memory 104.

In one implementation, central processing unit(s) 102 include a cache 103 with software accessible metadata 105. These metadata are described in further detail in several other figures herein. One or more hardware assisted software application(s) 150 can access the metadata 105 of the CPU cache 103 to facilitate an operation of the respective software application. A few non-limiting examples of hardware assisted software applications can include, but are not limited to transactional memory systems, garbage collection systems, systems for analyzing the performance or run-time behavior of programs, systems for finding defects in programs, systems for enforcing security constraints on programs, and/or any other types of software applications that can be improved (either in performance or in some other way) by using the metadata 105 on the CPU cache 103. These software applications may directly read and write the metadata as appropriate for the given scenario. Alternatively or additionally, the hardware itself may read and/or modify the metadata as appropriate.

Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 109 and non-removable storage 110. Computer storage media includes volatile and non-volatile, removable and non-removable media implemented in any method or technology for storage of information such as computer readable instructions, data structures, program modules or other data. Memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

Figure 2:
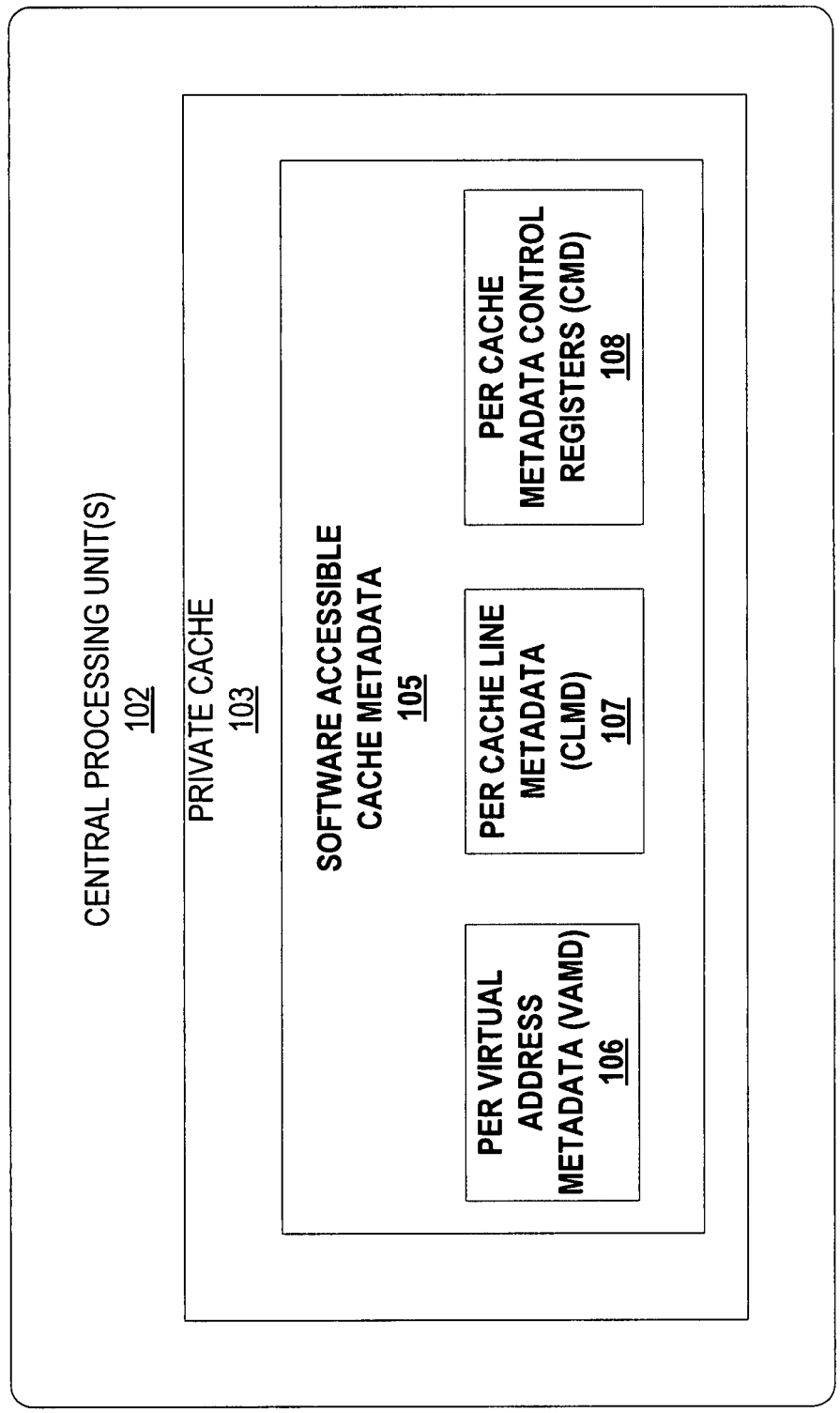
FIG. 2 is a more detailed diagrammatic view of a central processing unit of one implementation operating on the computer system of FIG. 1.

FIG. 2 is a more detailed diagrammatic view of a central processing unit 102 of one implementation operating on the computer system of FIG. 1. Cache 103 of CPU 102 includes software accessible cache metadata 105. This metadata (for short) is additional, software accessible state associated with cached data. With the exception of the cache metadata control registers described below, the cache metadata state is retained only for the time interval that its corresponding data is cached. In the example shown, the software accessible metadata 105 include per virtual address metadata (called VAMD herein) 106, per cache line metadata (called CLMD herein), and/or per cache metadata control registers (called CMD herein) 108. The VAMD 106, CLMD 107, and/or CMD 108 metadata in the CPU cache 103 can be accessed by one or more software applications to improve an operation of the respective application. It will be appreciated that in other implementations, some, additional, and/or other types of metadata could be used in the cache than those shown in FIG. 2, or in a hardware location other than the cache. For example, the VAMD state to be described could reside in a separate cache-like structure disjoint from CPU cache(s), and the CLMD state could reside in a separate centralized or distributed structure that interacts with the cache coherence system but is nevertheless disjoint from CPU cache(s). For the sake of illustration, however, these metadata 105 will be discussed in further detail in various figures herein to describe some techniques for improving software application operation.

FIG. 3 is a diagram illustrating exemplary hardware instructions 170 that implement additional metadata per logical processor per cache line for the system of FIG. 1. The term logical processor as used herein is meant to include each of the one or more actual CPU cores, and/or multithreaded CPU cores' hardware thread contexts ([007]) that share a single cache. In the exemplary instructions 170 shown, each virtual address metadata (VAMD) of each quadword of the cache line of each logical processor is allocated four bits of metadata, and each cache line metadata (CLMD) of each cache line of each logical processor is allocated eight bits of metadata. These bit allocations are exemplary in nature, and other allocations could be used in other implementations. Furthermore, in the example shown in FIG. 3 and discussed herein, a VAMD is assigned to each 64-bit quadword of data in the cache line. One reason for using a quadword in the non-limiting example is because it is currently the smallest power-of-two block size for which there will never be two separate transacted objects in the same block. However, it will be appreciated that in other implementations, something smaller or larger than a quadword could be used for each VAMD and still take advantage of some or all of the various techniques discussed herein. It is important to note there is but one CLMD per cache line per logical processor that shares the cache; but there are potentially many VAMDs (one quadword) per cache line per logical processor.

Turning now to FIG. 4, a diagram is shown that illustrates exemplary hardware state 190 that implement cache metadata control registers per logical processor per cache. In the example shown, these registers 190 control and track various cache metadata behaviors, including CLMD evictions summaries, CLMD speculative writes, a CLMD default value, a VAMD default value, a transaction handler vector address and an CLMD eviction mask that triggers a transaction handler invocation. Some, all, and/or additional cache-level details can be tracked as part of the CMD. Some uses of these metadata are described in later examples.

Shown below is a C-language-esque hardware definition pseudocode of the baseline cache state and new cache metadata state hardware state for a four logical processor system that includes the new VAMD, CLMD, and CMD instructions shown in FIGS. 3 and 4. The new state is highlighted in bold. In one implementation, these instructions are private per core, but shared between logical processors.

```
// Simple exemplary 64 KB direct mapped L1 d-cache
const int NLPS = 4;                         // no. of logical processors
const int NLINES = 1024;
const int LINESIZE = 64; // line size (bytes)
typedef void* VA;                           // virtual address
typedef void* PA;                           // physical address
typedef void* VALUE;                        // arbitrary integer or FP data
typedef int LP;                             // logical processor no.
typedef void (*HANDLER)( );                 // function pointer e.g. address in instruction stream
const int VAMDBITS = 4;                     // no. of virtual address metadata bits
typedef bit VAMD[VAMDBITS];                 // virtual address metadata "word"
const int VAMDSTRIDE = 8;                   // no. of bytes covered per VAMD (e.g. quadword)
const int NVAMDS = LINESIZE/VAMDSTRIDE;
const int CLMDBITS = 8;                     // no. of line metadata bits
typedef bit CLMD[CLMDBITS];                 // line metadata "word"
const int CLMD_SPECWRITE = 0;               // bit position of special CLMD bit to
                                            // track and enforce speculative writes
struct LINE {
    PA tag;
    enum MESI { M, E, S, I } mesi;
    byte data[LINESIZE];
    VAMD vamds[NVAMDS][NLPS];               // separate VAMD per quadword per log.
proc.   CLMD clmds[NLPS];                   // separate CLMD per logical processor
}
struct CMD {                                // cache metadata
                                                CLMD clmd_evictions;
                                            // or'd line evictions+invals summary
                                                CLMD clmd_specwritesmask;   // subset
                                            of CLMD bits that indicate// speculative writes
    CLMD clmd_default;                      // default line load CLMD value
    VAMD vamd_default;                      // default line load VAMD value
                                            //  (copied to every quadwords' VAMDs)
    HANDLER clmd_eviction_handler;                // eviction handler address
    CLMD clmd_eviction_handler_mask;              // eviction handler event mask
}
struct CACHE {
    LINE lines[NLINES];
    ...     CMD cmds[NLPS];
}
struct CORE {
    ...
    CACHE dcache;
    LP lp;                                  // current logical processor no.
}
CORE core;
```

It should be emphasized that the abstract hardware definition pseudocode used throughout this detailed description is not an executable software program per se. Rather, it denotes in a relatively compact notation the novel cache metadata state and behaviors that a skilled computer designer must then recode into a circuit description or a concrete hardware definition language such as Verilog or VHDL.

In the non-limiting example shown above, for a 4-logical processor example sharing a 64 KB L1 cache, with 1024 64 byte lines, the additional cache metadata storage overhead is: 4 threads*8 bits*2K (lines)+4 threads*4 bits*8K (quadwords)=64 Kbit+128 Kbit=24 KB, or about 37% of the size of the entire cache. As noted previously, numerous other allocations and/or arrangements of CPU cache metadata could be used than shown in this hypothetical example.

Figure 5:
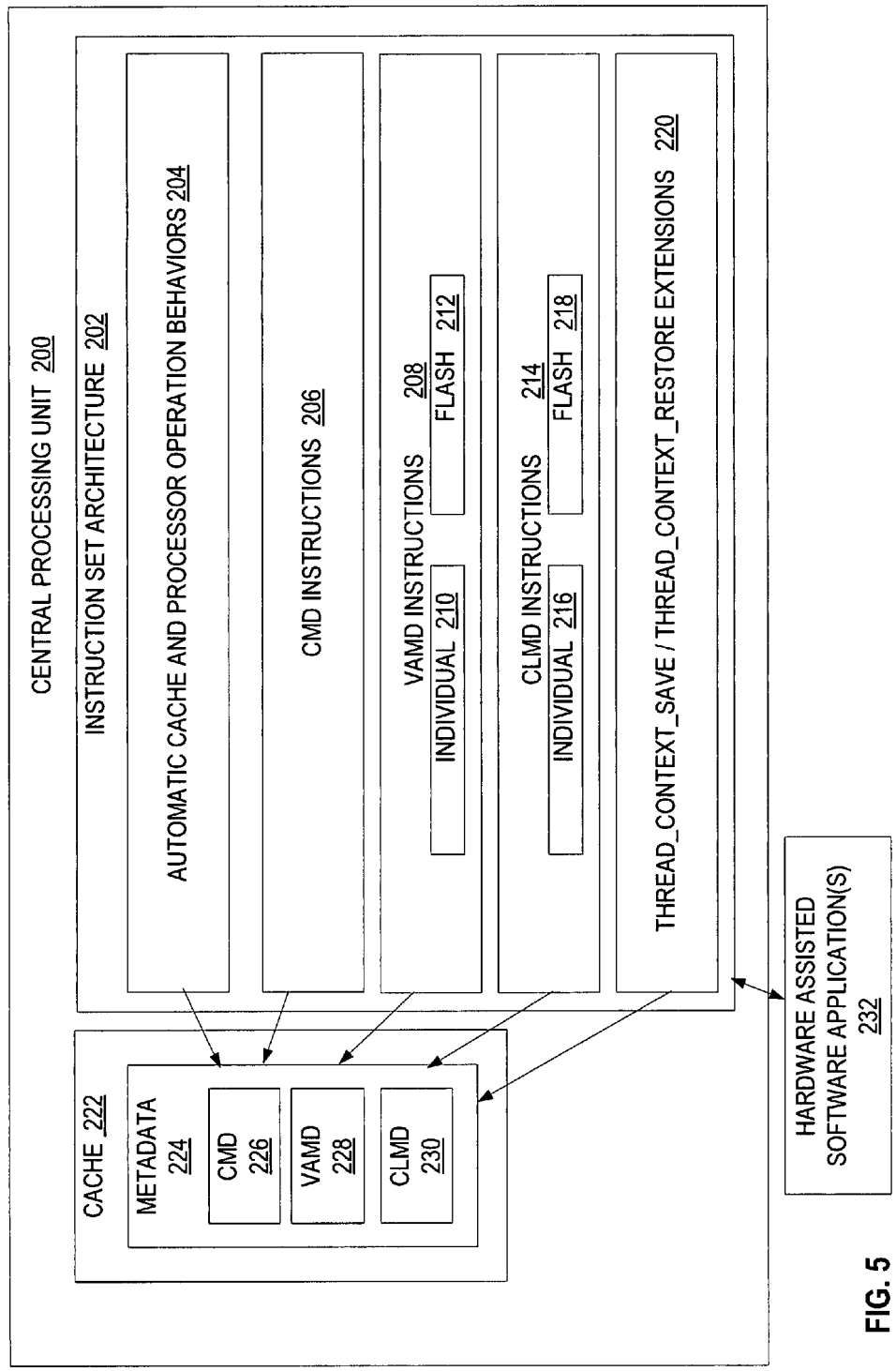
FIG. 5 is diagrammatic view of a central processing unit of the system of FIG. 1 illustrating an exemplary instruction set architecture and its interaction with cache metadata.

Turning now to FIG. 5, a diagrammatic view of a central processing unit 200 is shown that illustrates an exemplary 'cache metadata enhanced hardware instruction set architecture 202 provided by central processing unit 200, and its interaction with cache metadata 224 of the CPU cache 222. In one implementation, instruction set architecture 202 includes automatic cache and processor operation behaviors 204, CMD instructions 206, VAMD instructions 208, CLMD instructions 214, and thread context switch save/restore extensions 220. The automatic cache and processor operation behaviors 204 can interact with various metadata 224, as described in further detail in FIGS. 6-8. The CMD instructions 206 can interact with various metadata 226, as described in further detail in FIG. 9. VAMD instructions 208 include both individual instructions 210 and flash instructions 212. The VAMD instructions 208 can interact with the VAMD metadata 228 and/or other metadata as described in further detail in FIG. 10. CLMD instructions 214 can interact with the CLMD metadata 230 and/or other metadata as described in further detail in FIG. 11. CLMD instructions 214 include both individual instructions 216 and flash instructions 218. The thread context switch save/restore extensions 220 can interact with various metadata 224, as described in further detail in FIG. 12.

Figure 6:
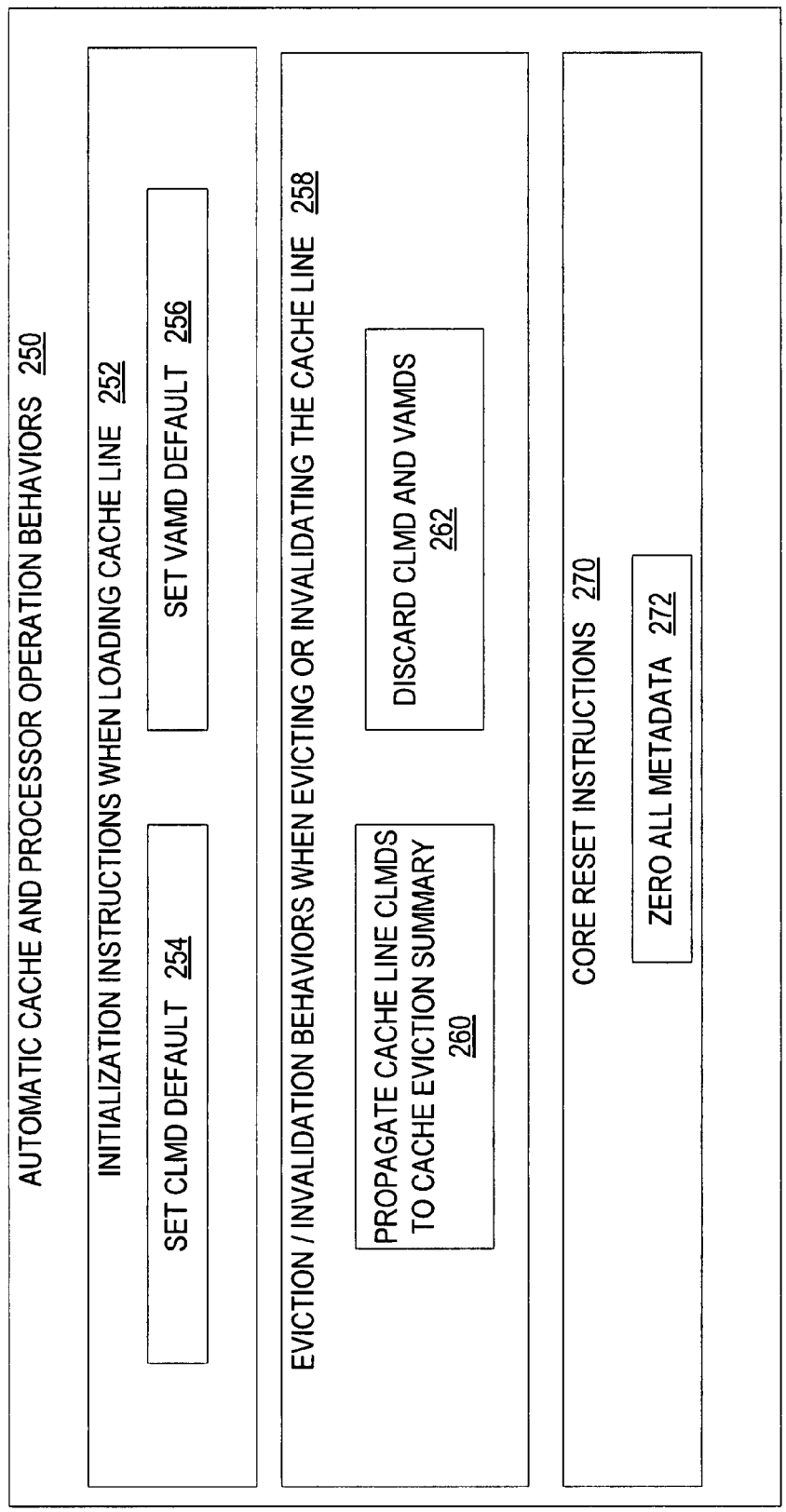
FIG. 6 is a diagrammatic view of exemplary automatic cache and processor operation instructions for the central processing unit of FIG. 5.

FIG. 6 is a diagrammatic view of exemplary automatic cache and processor operation behaviors 250 for the central processing unit 200 of FIG. 5. These behaviors extend prior art CPU+cache operations so as to account for the new cache metadata state. This impacts initialization (validation) 252, eviction/invalidation 258, and core reset operations 270. Cache line initialization occurs implicitly upon a cache line 252 during the hardware processing of a cache miss. Cache line initialization sets the the line's CLMDs to the default value 254, and its VAMDs to the default value 256. Below is an example hardware definition pseudocode that illustrates additional initialization behaviors 252 for setting the default CLMDs 254 and the default VAMDs 256 for each logical processor. These stages are described in more detail in FIG. 7.

```
// load and validate the designated cache line
void load_line(LINE& line) += { // here += denotes extension of baseline
load_line behavior
    // initialize each logical processor's clmd
    for (int lp = 0; lp < NLPS; lp++)
        line.clmds[lp] = dcache.cmds[lp].clmd_default;
    // initialize each logical processor's line's vamds.
    for (int lp = 0; lp < NLPS; lp++)
        for (int i = 0; i < NVAMDS; i++)
            line.vamds[i][lp] = dcache.cmds[lp].vamd_default;
}
```

The eviction/invalidation operations 258 are designed to run when evicting or invalidating the cache line. Eviction occurs when a memory access from some logical processor on this cache forces some valid cache line to be repurposed to retain the newly accessed data. In that case, the data contents of the cache line are discarded or written back to memory, and the metadata contents are completely discarded. Invalidation occurs when a coherent memory access from another core forces a line to transition from a valid state to invalid in this particular level of the cache in this core. There are instructions for propagating the cache line CLMDs to the cache eviction summary 260 when the CPU determines that it is time to evict or invalidate a cache line. There are also instructions for discarding the CLMD and VAMD bits 262. An example hardware definition pseudocode is shown below for implementing these eviction/invalidation behaviors 258. These are described in further detail in FIG. 8.

```
// extend the baseline eviction behavior to also discard the line's cache
metadata
void evict_line(LINE& line) += {
    discard_line(line);
}
// extend the baseline invalidation behavior to also discard the line's
cache metadata
void invalidate_line(LINE& line) += {
    discard_line(line);
}
// the cache line is being repurposed; discard the line's cache metadata
void discard_line(LINE& line) {
    for (int lp = 0; lp < NLPS; lp++) {
        // Accumulate an eviction summary:
        // Propagate the line's CLMD metadata to its eviction
        summary via
        // a bitwise-or logical operation.
        dcache.cmds[lp].clmd_evictions |= line.clmds[lp];
        // Invalidate line (don't write back the line) if it is
        modified but was
        // speculatively written by *any* logical processor on this
        core.
        //
        if (line.mesi == MESI.M /* modified */ &&
            (line.clmds[lp] & dcache.cmds[lp].clmd_specwritesmask)
            != 0)
                line.mesi = MESI.I;
    }
}
```

Core reset instructions 270 can also be included to zero out all of the metadata 272. An example hardware instruction that zeros out all of the metadata is shown below. In the example shown, all cache metadata mode state bits are zeroed and all metadata is zeroed. For example, the CLMD evictions, CLMD speculative writes, the default CLMD value, and the default VAMD value are all set to zero.

```
// extend the baseline CPU core reset behavior to also reset the
cache metadata
void core_reset( ) += {
    vamd_and_all((VAMD)0); // hardware definition pseudocode
    follows below
    clmd_and_all((CLMD)0);
    for (LP lp = 0; lp < NLPS; lp++) {
        CMD& cmd = dcache.cmds[lp];
        cmd.clmd_evictions = 0;
        cmd.clmd_specwrites = 0;
        cmd.clmd_default = 0;
        cmd.vamd_default = 0;
        cmd.clmd_eviction_handler = 0;
        cmd.clmd_eviction_handler_mask = 0;
    }
}
```

Figure 7:
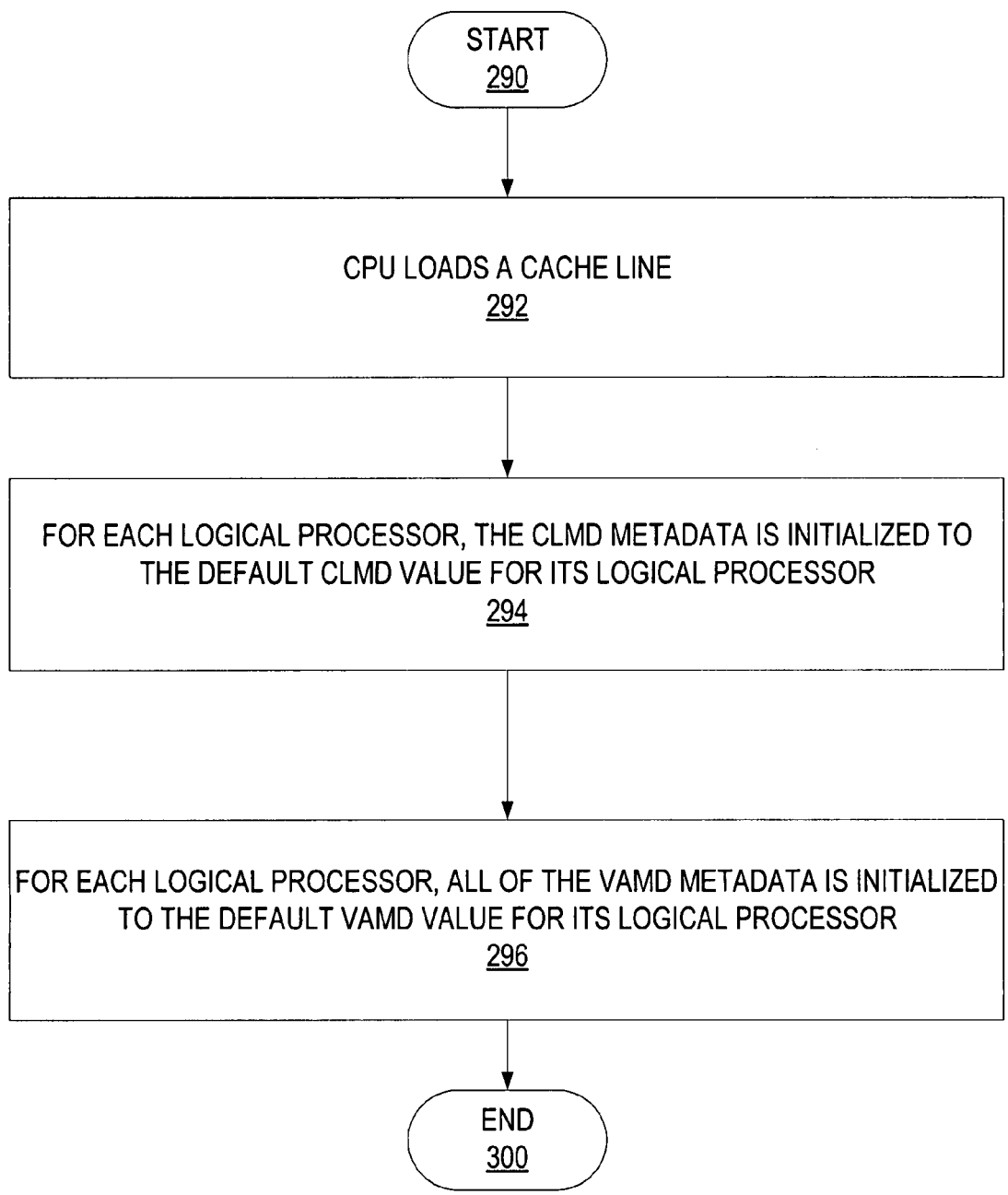
FIG. 7 is a process flow diagram for one implementation of the system of FIG. 1 that illustrates the stages involved in loading a cache line and initializing some cache metadata to default values.

Turning now to FIG. 7, one implementation of the stages involved in loading a cache line and initializing some cache metadata to default values is illustrated in further detail (than as initially described as part of the initialization instructions 252 of FIG. 6). In one form, the process of FIG. 7 is implemented in the hardware of computing device 100. The process begins at start point 290 with the CPU loading a cache line (stage 292). For each logical processor, the CLMD metadata is initialized to its logical-processor-specific default value (stage 294). For each logical processor, the VAMD metadata is similarly initialized to its LP-specific default value (stage 296). The process ends at end point 300.

Figure 8:
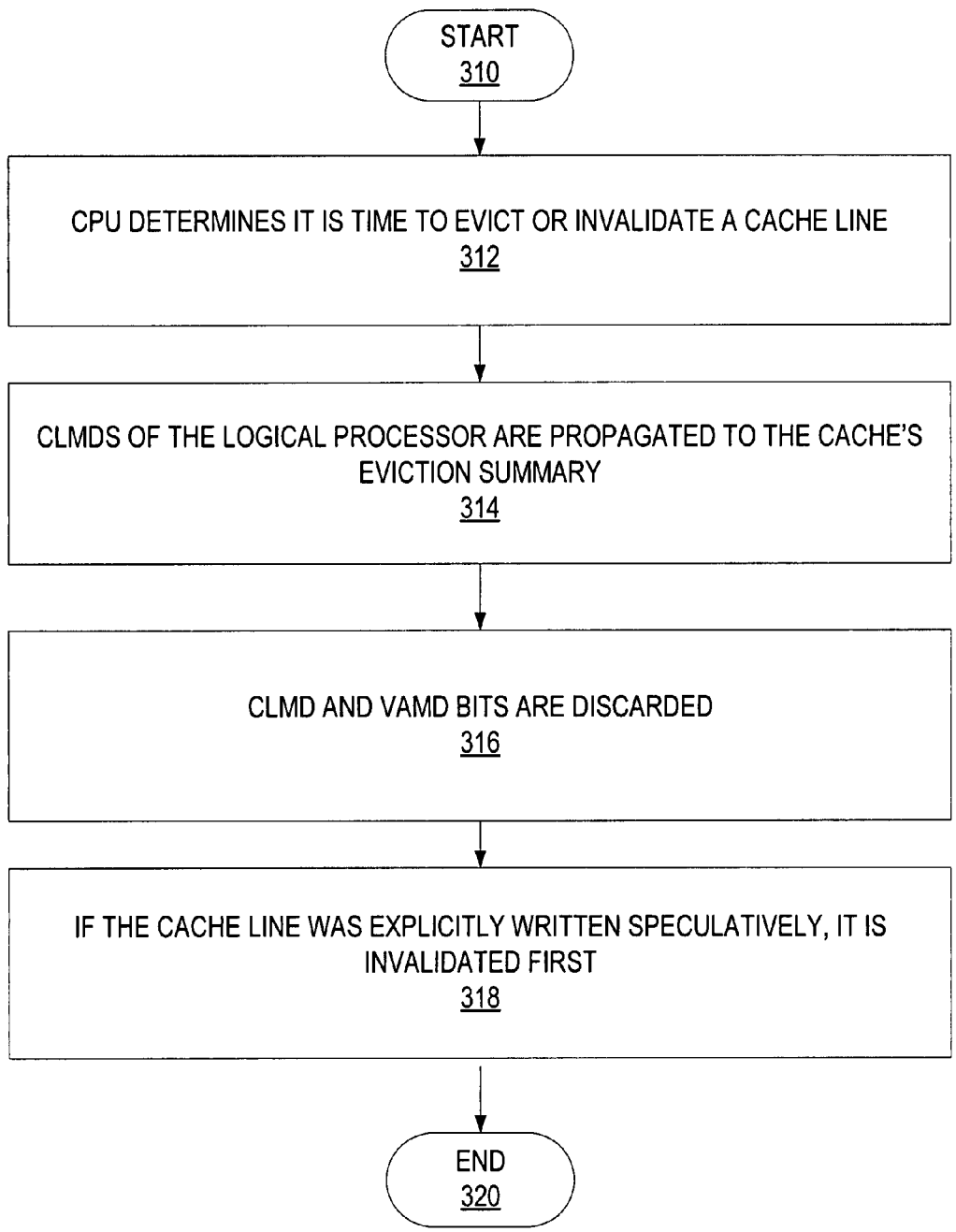
FIG. 8 is a process flow diagram for one implementation of the system of FIG. 1 that illustrates the stages involved in evicting or invalidating a cache line.

In FIG. 8, one implementation of the stages involved in evicting or invalidating a cache line is shown in further detail (than as initially described as part of the eviction/invalidation instructions 258 of FIG. 6). In one form, the process of FIG. 8 is implemented in the hardware of computing device 100. The process begins at start point 310 with the CPU determining it is time to evict or invalidate a cache line (stage 312). The CLMD's of the logical processor are propagated to the cache's eviction summary (stage 314). The line's CLMD and VAMD bits are then discarded (stage 316). If the cache line was explicitly written speculatively, it is invalidated first (not written back to main memory) (stage 318). The process ends at end point 320.

FIG. 9 is a diagrammatic view of exemplary CMD instructions for the central processing unit 200 of FIG. 5. As with all the new instructions introduced herein, these instructions extend and complement a base set of hardware instructions provided by a conventional CPU. In other words, they extend the base instruction set architecture. These hardware instructions are used by software to interact with various cache metadata state, and control cache metadata behaviors. For example, there are instructions for setting and getting the VAMD default value control register (332 and 334), and for setting and getting the CLMD default value control register (336 and 338). An example of hardware instruction definition pseudocode that could be used to provide such functionality for setting and getting these default values is shown below. (Here, the hardware definition pseudocode attribute "instruction" on a function designates the hardware operation is (or can be) made available as a novel CPU instruction for explicit use by software. In such cases, the function name suggests the CPU instruction name and its function arguments and return value suggest in- and out-parameters of the corresponding instruction, most commonly expressed as programmer specified registers or as implicit condition codes.)

```
// SET_VAMD_DEFAULT:
// Set the current default VAMD control register for this logical processor.
instruction void cache_set_vamd_default(VAMD vamd) {
    dcache.cmds[lp].vamd_default = vamd;
}
// GET_VAMD_DEFAULT:
// Get the current default VAMD control register for this logical processor.
instruction VAMD cache_get_vamd_default( ) {
    return dcache.cmds[lp].vamd_default;
}
// SET_CLMD_DEFAULT:
// Set the current default CLMD control register for this logical processor.
instruction void cache_set_clmd_default(CLMD clmd) {
    dcache.cmds[lp].clmd_default = clmd;
}
// GET_CLMD_DEFAULT:
// Set the current default CLMD control register for this logical processor.
instruction CLMD cache_get_clmd_default( ) {
    return dcache.cmds[lp].clmd_default;
}
```

In one implementation, CMD instructions 330 also include instructions for setting and getting the CLMD speculative writes control register (342 and 344), which sets and gets the control register that determines which CLMD bits that indicate the line has been speculatively written. An example of hardware instruction definition pseudocode that can be used to set and get the speculative writes is shown below.

```
// SET_CLMD_SPECWRITES:
// Set the current speculative writes CLMD mask control register for this
logical processor.
instruction void cache_set_clmd_specwrites(CLMD mask) {
    dcache.cmds[lp].clmd_specwrites = mask;
}
// GET_CLMD_SPECWRITES:
// Get the current speculative writes CLMD mask control register for this
logical processor.
instruction CLMD cache_get_clmd_specwrites(CLMD mask) {
    return dcache.cmds[lp].clmd_specwrites;
}
```

In one implementation, CMD instructions 330 includes instructions for setting and getting the CLMD evictions summary control register (344 and 346). An example of hardware instruction definition pseudocode that can be used to set and get the CLMD evictions is shown below.

```
// SET_CLMD_EVICTIONS:
// Set the current CLMD evictions summary control register for this
logical processor.
instruction void cache_set_clmd_evictions(CLMD clmd) {
    dcache.cmds[lp].clmd_evictions = clmd;
}
// GET_CLMD_EVICTIONS:
// Get the current CLMD evictions summary control register for this
logical processor.
instruction CLMD cache_get_clmd_evictions( ) {
    return dcache.cmds[lp].clmd_evictions;
}
```

In one implementation, CMD instructions 330 includes instructions for setting and getting the CLMD eviction handler address and handler mask control registers (190). An example of hardware instruction definition pseudocode that can be used to set and get the CLMD evictions is shown below.

```
// SET_CLMD_EVICTION_HANDLER:
// Set the current CLMD eviction handler register for this
logical processor.
instruction void cache_set_clmd_eviction_handler(HANDLER handler) {
    dcache.cmds[lp].clmd_eviction_handler = handler;
}
// GET_CLMD_EVICTION_HANDLER:
// Get the current CLMD evictions summary control register for
this logical processor.
instruction HANDLER cache_get_clmd_evictions( ) {
    return dcache.cmds[lp].clmd_eviction_handler;
}
// SET_CLMD_EVICTION_HANDLER_MASK:
// Set the current CLMD eviction handler mask control register
for this logical processor.
instruction void cache_set_clmd_eviction_handler(CLMD clmd) {
    dcache.cmds[lp].clmd_eviction_handler_mask = clmd;
}
// GET_CLMD_EVICTION_HANDLER_MASK:
// Get the current CLMD evictions handler mask control register
for this logical processor.
instruction CLMD cache_get_clmd_eviction_handler_mask( ) {
    return dcache.cmds[lp].clmd_eviction_handler_mask;
}
```

In one implementation, CMD instructions 330 can include hardware instructions for conditionally testing evictions with flash clearing and setting CLMD values on all cache lines 348. This can be used in a bounded transactional memory system, or for other purposes, as described in further detail herein. An example of hardware instruction definition pseudocode that can be used to conditionally test evictions with flash clear/set is shown below.

```
// COND_TEST_EVICTIONS_AND_OR_ALL:
// Atomically test whether any specific CLMD bits' evictions or
invalidations
// have occurred;
// and if not, flash clear (via AND) and flash set (via OR) specific
CLMD bit positions.
instruction bool cache_cond_test_evictions_and_or_all(
    CLMD clmd,              // mask, specifies noteworthy
                            CLMD eviction bits
    CLMD and_mask,          // mask, specifies CLMD bit
                            positions to retain (AND)
    CLMD or_mask)           // mask, specifies CLMD bit
                            positions to set (OR)
{
    // 'atomic' means the inner block happens instantaneously, without
    // intervening interference from nor impact upon other CPUs or
    agents
    // in the system
    atomic {
        // Determine if there were any evictions of interest
        CLMD evictions = cache_get_clmd_evictions( );
        if ((evictions & clmd) == 0) {
            // If not AND and then OR the bit masks over all CLMD
            // metadata in the cache.
            clmd_and_all(and_mask);
            clmd_or_all(or_mask);
            return true;
        }
        else {
            return false;
        }
    }
}
```

In one implementation, CMD instructions 330 can include hardware instructions for conditionally discarding cache lines 349 based on the CLMD. An example of hardware instruction definition pseudcode that can be used to conditionally discard cache lines is shown below.

```
// COND_DISCARD
// Conditionally flash clear all cache lines of this logical processor with
CLMDs
// with specific CLMD bit positions set.
instruction void cache_cond_discard(CLMD clmd) {
    for (int i = 0; i < NLINES; i++) {
        if ((dcache.lines[i].clmds[lp] & clmd) != 0) {
            discard_line(dcache.lines[i]);
        }
    }
}
```

CMD instructions can also include instructions for getting the implemented size of certain data, such as getting cache line size 350, getting VAMD bits 352, getting VAMD stride 354, or getting CLMD size 356. An example hardware instruction definition pseudocode that can be used to get these basic metadata value sizes is shown below.

```
// GET_CACHE_LINE_SIZE
instruction unsigned get_cache_line_size( ) {
    return LINESIZE;
}
// GET_VAMD_BITS:
// Return implemented no. of VAMD_BITS (no. of bits in a VAMD).
instruction unsigned get_vamd_bits( ) {
    return VAMD_BITS;
}
// GET_VAMD_STRIDE:
// Return implemented VAMD_STRIDE bytes (no. of data bytes per
VAMD).
instruction unsigned get_vamd_stride( ) {
    return VAMD_STRIDE;
}
// GET_CLMD_BITS:
// Return implemented no. of CLMD_BITS (no. of bits in a CLMD).
instruction unsigned get_clmd_bits( ) {
    return CLMD_BITS;
}
```

An alternative implementation might provide such implementation specific parameter data via an alternative mechanism such as a general-purpose CPUID instruction.

Figure 10:
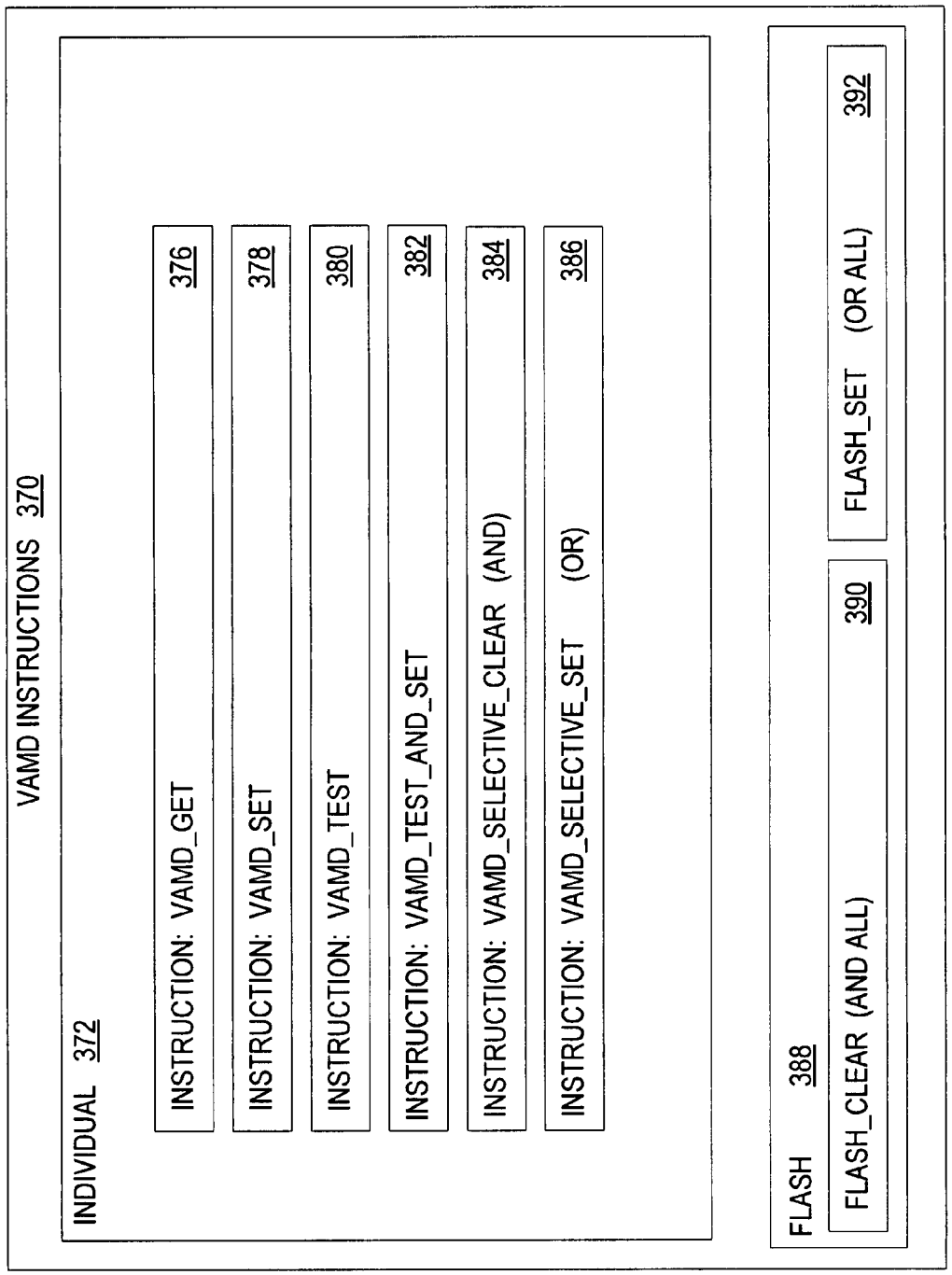
FIG. 10 is a diagrammatic view of exemplary VAMD instructions for the central processing unit of FIG. 5.

Turning now to FIG. 10, a diagrammatic view of exemplary VAMD instructions for the central processing unit 200 of FIG. 5 is shown. VAMD instructions 370 include individual instructions 372 that access specific VAMDs one at a time, and the flash instructions 388 that apply to all VAMDs in the cache. The individual instructions 372 can include instructions for implementing a VAMD get 376, a VAMD set 378, a VAMD test and set 382, a VAMD selective clear (and) 384, and a VAMD selective set (OR) 386.

We introduce a private VAMD helper pseudocode function that (like a read data instruction) takes an address 'va' and ensures its data is cached; then returns a reference (which in hardware, might be a control signal bit pattern) to the specific VAMD corresponding to the quadword of bytes at address va.

```
private VAMD& vamd_va(VA va) {
    validate_line(va);
    return dcache.lines[line_va(va)].vamds[offset_va(va)][lp];
}
```

The VAMD get instruction 376 selects and returns the current value of the particular VAMD that is appropriate for the particular address. The VAMD set instruction 378 stores a VAMD for the particular address. Example hardware definition pseudocode instructions for the get and set instructions are shown below.

```
// VAMD_GET
// Return the current VAMD for the datum at address 'va'.
// If the datum wasn't already in cache, it is now!
instruction VAMD vamd_get(VA va) {
    return vamd_va(va);
}
// VAMD_SET
// Set the current VAMD for the datum at the specified address 'va'.
// If the datum wasn't already in cache, it is now!
instruction void vamd_set(VAMD vamd, VA va) {
    vamd_va(va) = vamd;
}
```

The VAMD test instruction 380 fetches the VAMD for the particular address, performs an AND operation with the VAMD and the mask, and compares the result. In most CPU's base instruction set architectures, such comparison results are typically written to condition code registers or to general purpose registers. The VAMD test and set instruction 382 atomically tests and sets the address and then returns what was read before the set occurred. Example hardware instruction definition pseudocode for these two tests are shown below.

```
// VAMD_TEST
// Return true if all of the specified VAMD bits for the VAMD at 'va' are
set.
instruction bool vamd_test(VAMD vamd, VA va) {
    return (vamd_va(va) & vamd) == vamd;
}
// VAMD_TEST_AND_SET
// Return true if all of the specified VAMD bits for the VAMD at 'va' are
set;
// then set the specified bits.
instruction bool vamd_test_and_set(VAMD vamd, VA va) {
    atomic {
        bool ret = vamd_test(vamd, va);
        vamd_or(vamd, va);
        return ret;
    }
}
```

The VAMD selective clear instruction 384 selectively clears the VAMD and the VAMD selective set instruction 386 selectively sets the VAMD, as further illustrated in the hardware instructions below.

```
// VAMD_AND
// Bitwise-AND the VAMD mask against the VAMD for the specified
address 'va'.
// This may be used to clear certain VAMD bits.
instruction VAMD vamd_and(VAMD vamd, VA va) {
    return vamd_va(va) &= vamd;
}
// VAMD_OR
// Bitwise-OR the VAMD mask against the VAMD for the specified
address 'va'.
instruction VAMD vamd_or(VAMD vamd, VA va) {
    return vamd_va(va) |= vamd;
}
```

Alternatively or in addition to the individual instructions 372 for each VAMD cache line, whole cache flash VAMD instructions 388 can be provided. For example, a flash clear ('AND ALL') instruction 390 can be provided, along with a flash set ('OR_ALL') instruction 392. In the example hardware instruction definition pseudocode shown below, the VAMD_AND_ALL instruction is designed to flash clear designated VAMD bits of all of the VAMDs for each cache line of this logical processor, and the VAMD_OR_ALL instruction is designed to similarly flash set all of the VAMDs for each cache line of this logical processor.

```
// VAMD_AND_ALL
// Flash bitwise-AND the specified mask over all the current logical processor's
// VAMDs.
instruction void vamd_and_all(VAMD vamd) {
    for (int i = 0; i < NLINES; i++)
        for (int j = 0; j < NVAMDS; j++)
            dcache.lines[i].vamds[j][lp] &= vamd;
}
// VAMD_OR_ALL
// Flash bitwise-OR the specified mask over all the current logical processor's
// VAMDs.
instruction void vamd_or_all(VAMD vamd) {
    for (int i = 0; i < NLINES; i++)
        for (int j = 0; j < NVAMDS; j++)
            dcache.lines[i].vamds[j][lp] |= vamd;
}
```

Figure 11:
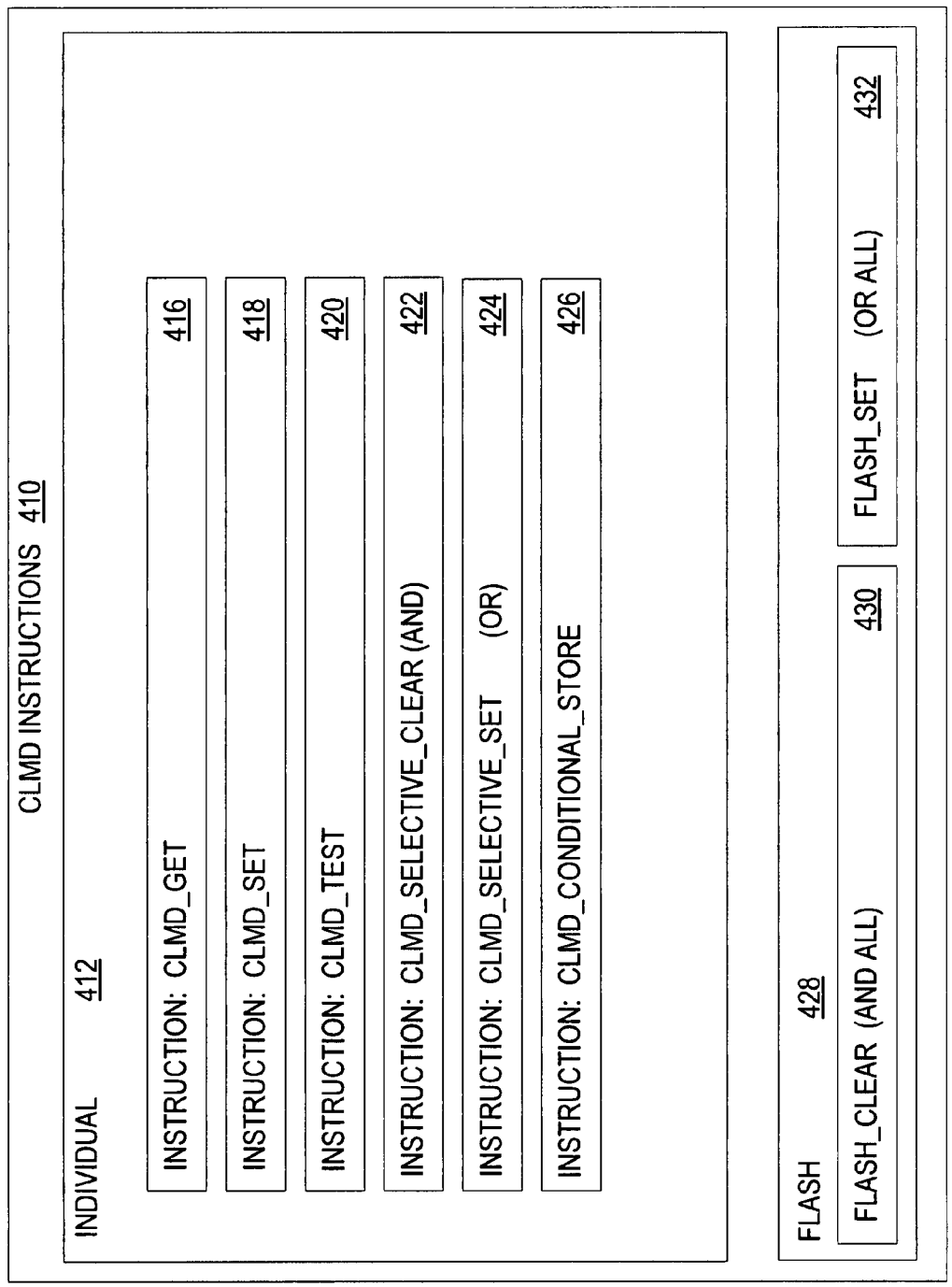
FIG. 11 is a diagrammatic view of exemplary CLMD instructions for the central processing unit of FIG. 5.

Turning now to FIG. 11, a diagrammatic view of exemplary CLMD instructions 410 for the central processing unit 200 of FIG. 5 is shown. In one implementation, there are individual instructions 412 for accessing a specific CLMD, one at a time, and flash instructions 428 that apply to all CLMDs. The individual instructions can include instructions for CLMD get 416, CLMD set 418, CLMD test 420, CLMD selective clear (AND) 422, CLMD selective set (OR) 424, and CLMD conditional store 426. These individual instructions operate similarly as just described with respect to the VAMD instructions, but are discussed herein briefly for the CLMD context. For example, the get and set instructions (416 and 418) get and set the value of the CLMD. The test instruction fetches the CLMD for the particular address, performs an AND operation with the CLMD and the mask, and compares the result. The test returns true if the bits in the mask are all set. The selective clear and selective set (422 and 424) performs selective clears or sets to the CLMD, respectively. Examples of hardware instruction definition pseudocode are shown below.

```
// (Helper pseudo-function.)
// Ensure the data for the cache line of data addressed by 'va' is valid in the cache; then
// return a reference to the line's CLMD.
private CLMD& clmd_va(VA va) {
    validate_line(va);
    return dcache.lines[line_va(va)].clmds[lp];
}
// CLMD_GET
// Return the current CLMD for the specified address 'va'.
instruction CLMD clmd_get(VA va) {
    return clmd_va(va);
}
// CLMD_SET
// Set the current CLMD for the specified address 'va'.
instruction void clmd_set(CLMD clmd, VA va) {
    clmd_va(va) = clmd;
}
// CLMD_TEST
// Return true if all of the specified CLMD bits for the CLMD for the specified
// 'va' are set.
instruction bool clmd_test(CLMD clmd, VA va) {
    return (clmd_va(va) & clmd) == clmd;
}
```

```
// CLMD_AND
// Bitwise-AND the CLMD mask against the CLMD for the specified address 'va'.
instruction CLMD clmd_and(CLMD clmd, VA va) {
    return clmd_va(va) &= clmd;
}
// CLMD_OR
// Bitwise-OR the CLMD mask against the CLMD for the specified address 'va'.
instruction CLMD clmd_or(CLMD clmd, VA va) {
    return clmd_va(va) |= clmd;
}
```

In one implementation, the CLMD conditional store instruction 426 is used for bounded transactional memory systems, or for other purposes, as described in further detail herein. This instruction tests to see if the property that was set earlier is still present, and if so, stores the value and returns true. Otherwise, a false is returned and the value is not stored. In other words, data is stored at the address only if it has the particular CLMD address that is needed. An example of a conditional store set of hardware instruction definition pseudocode is shown below.

```
// CLMD_COND_STORE
//   (exemplary of one of a family of conditional store instructions, one
for each data type)
//
instruction bool clmd_cond_store(CLMD clmd, VA va, VALUE value) {
    atomic {
        if (clmd_test(clmd, va)) {
            *va = value;
            return true;
        }
        else {
            return false;
        }
    }
}
```

Alternatively or additionally to the individual instructions 412 for the CLMD, whole cache flash CLMD instructions 428 can be provided. For example, a flash clear (AND ALL) instruction 430 can be provided, along with a flash set (OR ALL) instruction 432. In the example hardware instruction definition pseudocode shown below, the CLMD_AND_ALL instruction is designed to flash clear all of the CLMDs for each logical processor, and the CLMD_OR_ALL instruction is designed to flash set all of the CLMDs for each logical processor.

```
// CLMD_AND_ALL
// Flash bitwise-AND the specified mask over all the current logical processor's
// CLMDs.
instruction void clmd_and_all(CLMD clmd) {
    for (int i = 0; i < NLINES; i++)
        dcache.lines[i].clmds[lp] &= clmd;
}
// CLMD_OR_ALL
// Flash bitwise-OR the specified mask over all the current logical processor's
// VAMDs
instruction void clmd_or_all(CLMD clmd) {
    for (int i = 0; i < NLINES; i++)
        dcache.lines[i].clmds[lp] |= clmd;
}
```

Figure 12:
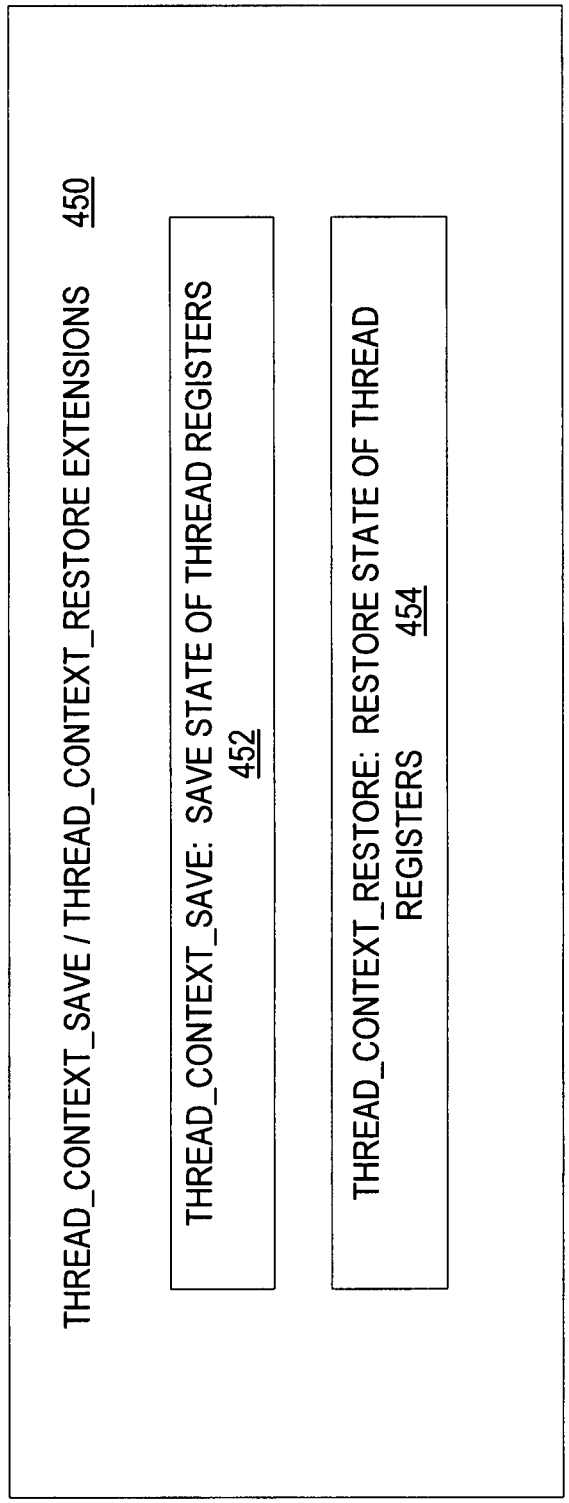
FIG. 12 is a diagrammatic view of exemplary context switch save and restore extensions for the central processing unit of FIG. 5.

FIG. 12 is a diagrammatic view of exemplary context switch save and restore extensions 450 for the central processing unit 200 of FIG. 5. These are used at context switch time to save and restore the thread context registers (e.g. the architected (programmer visible) thread stage, e.g. various general purpose register files, special registers, etc.). In one implementation, both of these instructions take a 512 byte context buffer as an argument. In one implementation, the context switch save and restore instructions can also save the logical processor's overall CMD state structure in some of the context buffer's currently reserved fields.

Turning now to FIGS. 13-26, some exemplary systems and techniques will be described that use some or all of the metadata, hardware instructions, and/or other techniques as described in FIGS. 1-12. FIGS. 13-16 illustrate some uses of the techniques described herein with a bounded transactional memory application. As described further in FIGS. 13-16, a bounded transactional memory application can use a programmable subset of the CLMD bits such that if any are ever set on a cache line, indicates that the line has transactionally read (and thus is watched for subsequent writes by other logical processors) or has been speculatively written in a transaction. Being speculatively written means that the line was written without knowledge yet if the values are actually going to be committed permanently or not. If such a speculatively written line is dirty and is then evicted, or read or written by another core, it is instead invalidated so that the writes are discarded. The bounded transactional memory application can also include an instruction that atomically tests a subset of the cache metadata CLMD eviction summary bits, and if no such evictions have occurred, atomically clears a subset of the CLMD bit(s) across all cache lines to commit permanently the speculative writes.

Figure 13:
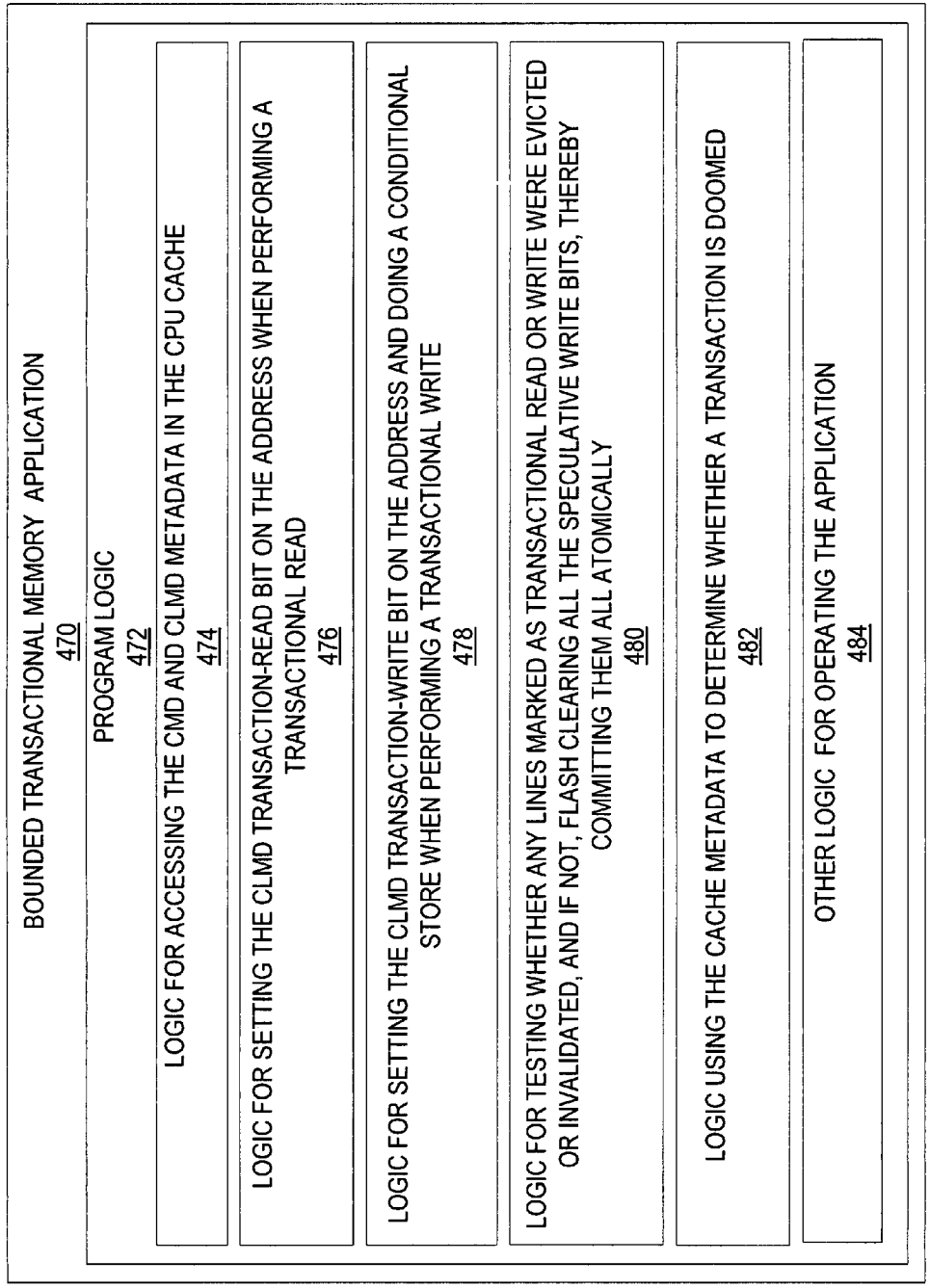
FIG. 13 is a diagrammatic view of a bounded transactional memory application of one implementation operating on the computer system of FIG. 1.

Turning now to FIG. 13, a diagrammatic view of a bounded transactional memory application of one implementation is shown. In one implementation, bounded transactional memory application 470 is one of the application programs that reside on computing device 100 (e.g. is one of hardware assisted software applications 150). However, it will be understood that bounded transactional memory application 470 can alternatively or additionally be embodied as computer-executable instructions on one or more computers and/ or in different variations than shown on FIG. 1. Alternatively or additionally, one or more parts of bounded transactional memory application 470 can be part of system memory 104, on other computers and/or applications 115, or other such variations as would occur to one in the computer software art.

Bounded transactional memory application 470 includes program logic 472, which is responsible for carrying out some or all of the techniques described herein. Program logic 472 includes logic for accessing the CMD and CLMD metadata in the CPU cache 474; logic for setting the CLMD transaction read bit on the address when performing a transactional read 476; logic for setting the CLMD transaction write bit on the address and doing a conditional store when performing a transactional write 478; logic for testing whether any lines marked as transactional read and write were evicted or invalidated, and if not, flash clearing all the speculative write bits, thereby committing them all atomically 480; logic for accessing the metadata to determine whether a transaction is doomed 482; and other logic for operating the application 484. In one implementation, program logic 472 is operable to be called programmatically from another program, such as using a single call to a procedure in program logic 472.

Figure 14:
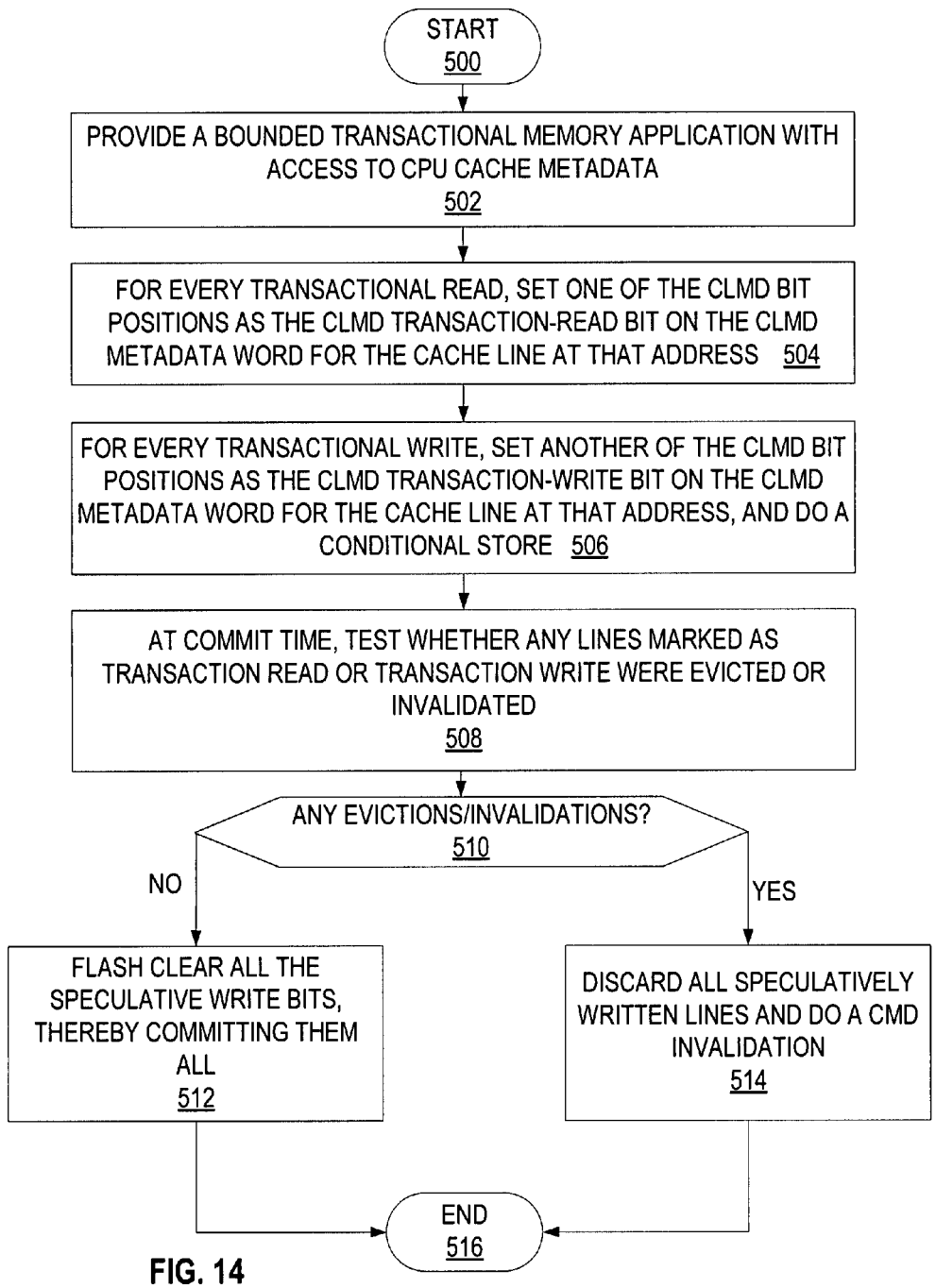
FIG. 14 is a process flow diagram for one implementation of the system of FIG. 1 that illustrates the stages involved in providing a bounded transactional memory application using cache metadata.

FIG. 14 illustrates one implementation of the stages involved in providing a bounded transactional memory application using cache metadata. In one form, the process of FIG. 14 is at least partially implemented in the operating logic of computing device 100. The process begins at start point 500 with the system providing a bounded transactional memory application with access to CPU cache metadata (stage 502). For every transactional read, the system sets one of the CLMD bit positions (for example, CLMD[0]), as the CLMD transaction-read bit on the CLMD metadata word for the cache line at that address (stage 504). For every transactional write, the system sets another of the CLMD bit positions (for example CLMD[1]), as the CLMD transaction-write bit on the CLMD metadata word for the cache line at that address, and does a conditional store (stage 506). At commit time, the system tests whether any lines marked as CLMD transaction-read or CLMD transaction-write were evicted or invalidated (stage 508). If no evictions/invalidations are found (decision point 510), then all the speculative write bits are flash cleared, thereby committing them all (stage 512). If any evictions/ invalidations are found (decision point 510), then all speculatively written lines are discarded and a CMD invalidation is done to reset all CLMDs and eviction data for the transaction (stage 514). The process ends at end point 516.

This algorithm correctly implements bounded transactional memory for concurrent transactions that that fit in the caches of each logical processor. Since every transactional read of data is explicitly annotated by software with a transaction-read bit on its cache line, and since every speculative transactional write of data is explicitly annotated by software with a transaction-write bit on its cache line, a transaction will only commit if during the time interval of execution, there were no conflicting accesses to data from other logical processors—in particular, if there were no writes (by other logical processors) of data read in the transaction, and if there were no reads (by other logical processors) of data written in the transaction. For if a conflicting access occurs, the behavior of multiprocessor cache coherence is to invalidate this transaction's logical processor's cached copy of the data, an event which due to behavior (258) is manifest as an eviction/ invalidation of non-zero CLMD data in the clmd_evictions register in the CMD (190). Furthermore, the algorithm correctly watches for any cache line eviction of the entirety of any transactionally accessed data in the time interval from each first reference up to the transaction commit attempt. If (as occurs during program execution) a cache miss occurs and a cache line must be evicted, and this cache line has CLMD cache metadata with transaction-read or transaction-write bits set, this event is also manifest via (258) as an eviction/ invalidation in the clmd_evictions register. In either case, the combination of software and hardware detects either any transaction conflict or capacity problem and thus guarantees correct transactional memory semantics.

Figure 15:
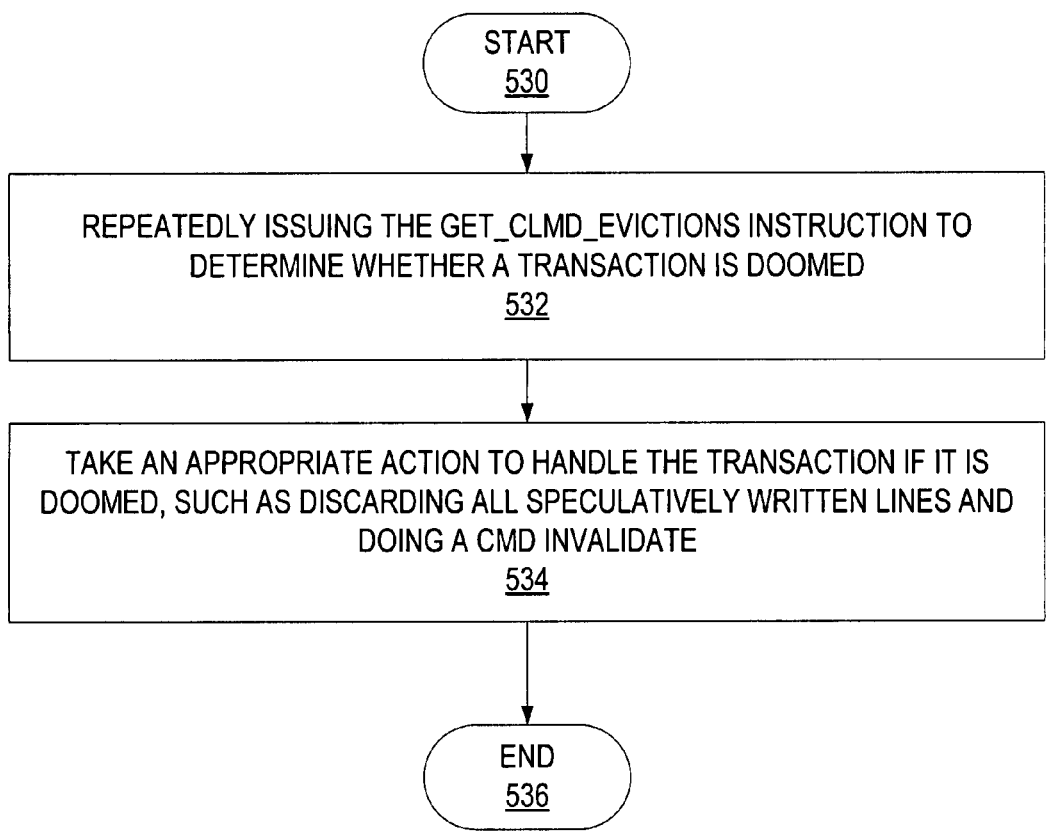
FIG. 15 is a process flow diagram for one implementation of the system of FIG. 1 that illustrates the stages involved in using the get CLMD evictions instruction to poll whether a transaction is doomed.

FIG. 15 illustrates one implementation of the stages involved in using the CLMD evictions instruction to poll whether a transaction is doomed due to conflicting access or capacity. In one form, the process of FIG. 15 is at least partially implemented in the operating logic of computing device 100. The process begins at start point 530 with repeatedly issuing the GET_CLMD_EVICTIONS instruction to determine whether a transaction is doomed (stage 532). An appropriate action is taken to handle the transaction if it is doomed, such as discarding all speculatively written lines and doing a CMD invalidate (stage 534). The process ends at end point 536.

Figure 16:
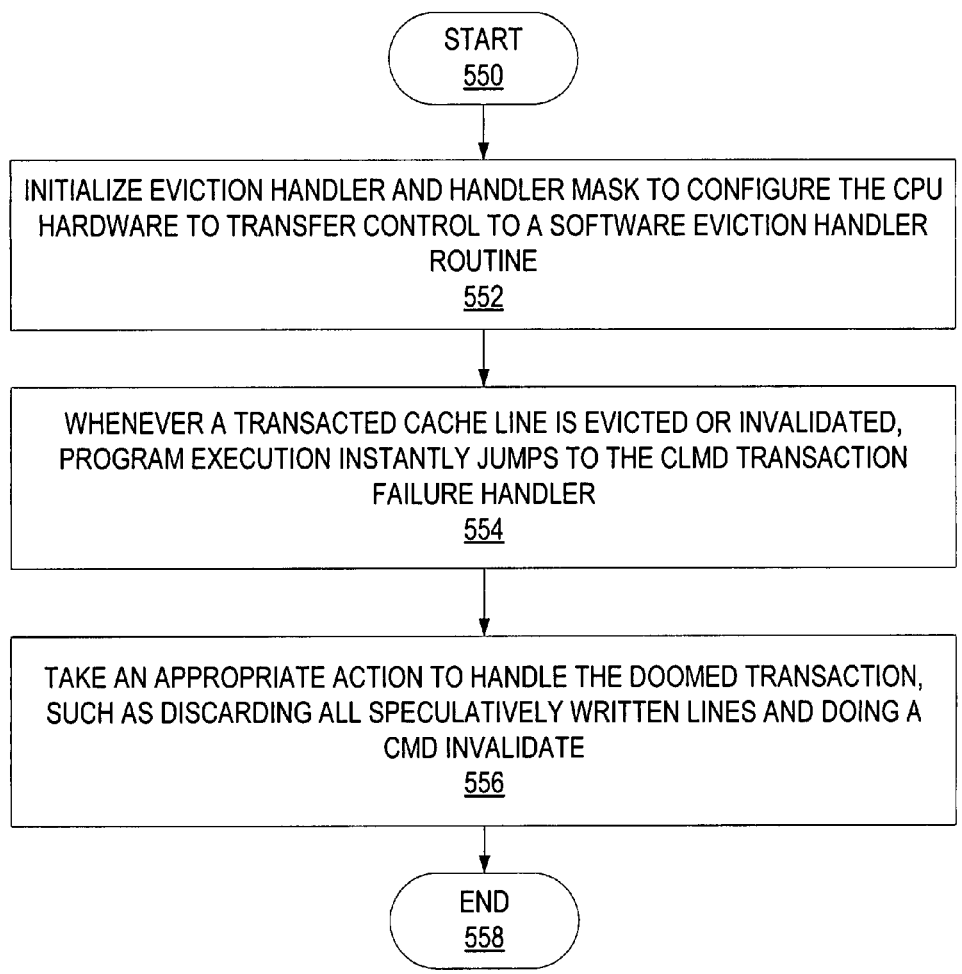
FIG. 16 is a process flow diagram for one implementation of the system of FIG. 1 that illustrates the stages involved in using an addition to the CMD structure to handle doomed transactions in hardware.

FIG. 16 illustrates one implementation of the stages involved in using an addition to the CMD structure to handle doomed transactions in hardware. In one form, the process of FIG. 16 is at least partially implemented in the operating logic of computing device 100. The process begins at start point 550 with initialization of the eviction handler and handler mask (stage 552). Using CLMD_SET_EVICTION_HANDLER and CLMD_SET_EVICTION_HANDLER_MASK instructions to initialize the clmd_eviction_handler and clmd_eviction_handler_mask CMD control registers, software configures the CPU hardware to transfer control to a software eviction handler routine the moment a cache line with CLMD bit transaction-write is evicted or invalidated (stage 552). Whenever such a transacted cache line is evicted or invalidated, program execution instantly jumps to the CLMD transaction failure handler (stage 554). An appropriate action is taken to handle the doomed transaction, such as discarding all speculatively written lines and doing a CMD invalidate (stage 556). The process ends at end point 558.

Some implementations may prevent recursive invocation of the handler by clearing the eviction_handler mask as the handler is first invoked. Turning now to FIGS. 17-23, a hardware accelerated software transactional memory system that uses cache metadata is described. In one implementation, the cache metadata is used by the software transactional memory system to accelerate some expensive aspects of such a system, such as redundant open_read barrier filtering, redundant write_undo barrier filtering, read log validation, retry operations, and these operations with nested transactions.

In the example software transactional memory system described herein, data's transaction status is described with reference to a transactional memory word (TMW). A TMW describes the transactional synchronization status for associated data that may be accessed in a transaction. For example, the TMW can include a version number, and/or a pointer to a transaction that has the data open for write, and/or a list/count and/or indicator of transactional readers (e.g. pessimistic readers). In one implementation, the list/count and/or indicator of readers can include a count of the number of readers (e.g. pessimistic) accessing the particular value at a given point in time. In another implementation, the list/count and/or indicator of readers can include a list of the particular readers (e.g. pessimistic) accessing the particular value at a given point in time. In yet another implementation, the list/count and/or indicator of readers is simply a flag or other indicator to indicate that there are one or more readers (e.g. pessimistic) accessing the particular value at a given point in time. These are just examples, and the use of the term TMW herein is meant to cover a variety of mechanisms for tracking lock statuses.

Figure 17:
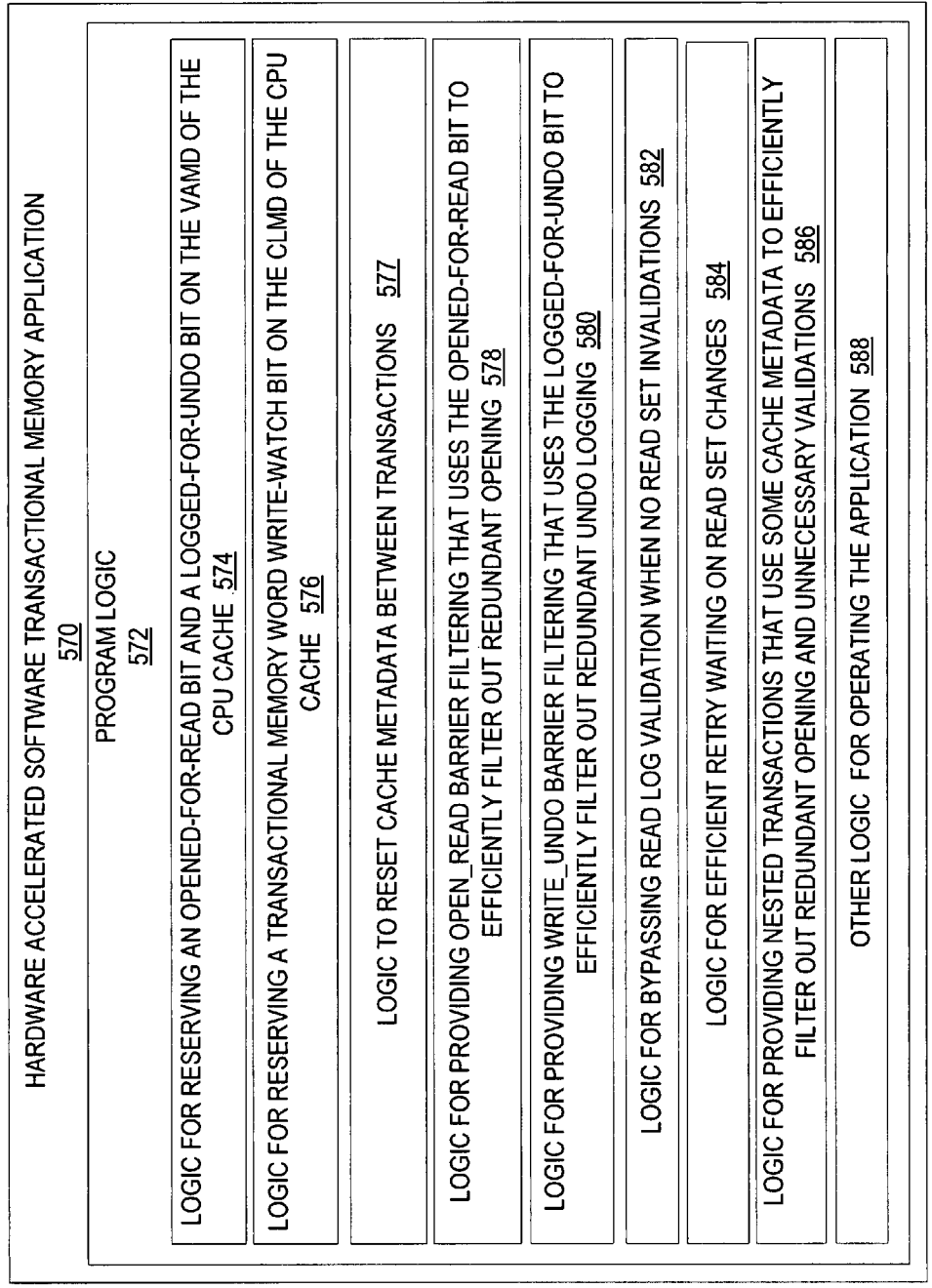
FIG. 17 is a diagrammatic view of a hardware accelerated software transactional memory application of one implementation operating on the computer system of FIG. 1.

Beginning with FIG. 17, a diagrammatic view of a hardware accelerated software transactional memory application is shown for one implementation operating on the computer system of FIG. 1 (e.g. as one of hardware assisted software applications 150). Hardware accelerated software transactional memory application 570 includes program logic 572, which is responsible for carrying out some or all of the techniques described herein. Program logic 572 includes logic for reserving an opened-for-read bit and a logged-for-undo bit on the VAMD of the CPU cache 574; logic for reserving a TMW write-watch bit on the CLMD of the CPU cache 576; logic to reset cache metadata between transactions 577; logic for providing Open_Read barrier filtering that uses the opened-for-read bit to avoid redundant read logging 578; logic for providing Write_Undo barrier filtering that uses the logged-for-undo bit to avoid redundant undo logging 580; logic for bypassing read log validation when there have been no read set invalidations (e.g. no writes from other threads to data this transaction has read) 582; logic for providing retry operations that mark CLMD lines 584; logic for providing nested transactions that use some cache metadata to avoid redundant filtering and unnecessary validations 586; and other logic for operating the application 588. These operations will now be described and/or defined in further detail in FIGS. 18-23.

As cache metadata state is used to accelerate filtering and bypassing away of various redundant or unnecessary transactional memory barriers and bookkeeping operations, and for other purposes, it is usually helpful to reset all cache metadata to zero between transactions so that one transaction's filter and write watch state does not impact some later transaction's filter and watch logic (577). In one form, all compressed metadata state may be quickly reset with a short sequence of instructions such as CLMD_AND_ALL and VAMD_AND_ALL, issued either before the transaction begins or immediately after it ends.

Figure 18:
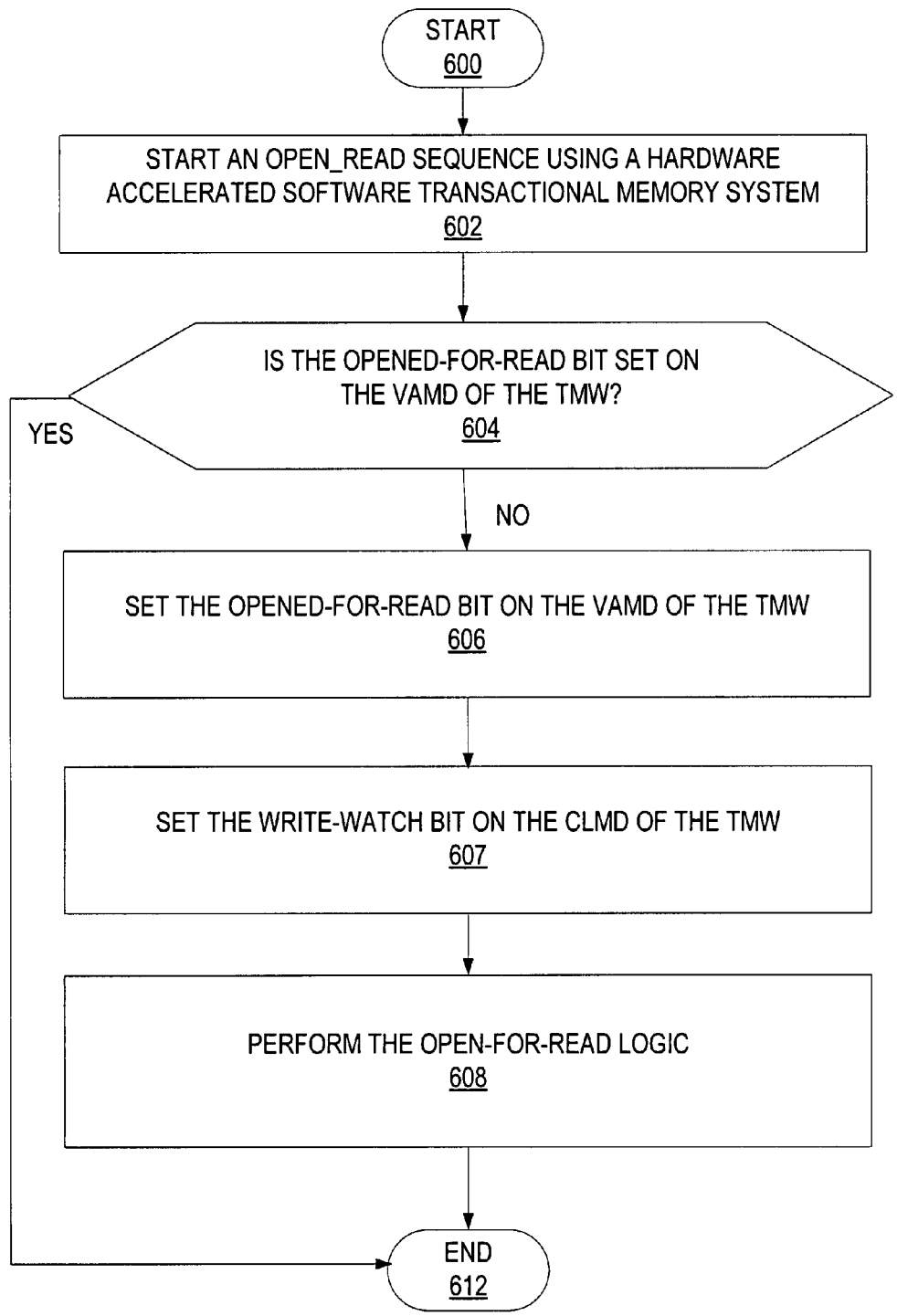
FIG. 18 is a process flow diagram for one implementation of the system of FIG. 1 that illustrates the stages involved in providing Open_Read barrier filtering that uses the opened-for-read bit on the VAMD of the CPU cache to avoid redundant filtering.

FIG. 18 illustrates one implementation of the stages involved in providing Open_Read barrier filtering that uses the opened-for-read bit position on the VAMDs of the cache metadata to efficiently filter out redundant transactional read logging. In one form, the process of FIG. 18 is at least partially implemented in the operating logic of computing device 100. The process begins at start point 600 with the system starting an Open_Read sequence using a hardware accelerated software transactional memory system (stage 602). If the VAMD opened-for-read bit is already set for the address of the the TMW (decision point 604), this indicates this TMW has already been opened for read in this transaction, and software jumps over the read barrier logging sequence (stages 606, 607, 608). Otherwise the system sets the opened-for-read bit on the VAMD of the address of the TMW (stage 606) and performs the transactional Open_Read logic. In one form, this logs the read access. In one form, stage 604 may be implemented with a VAMD_TEST instruction followed by a conditional jump, and stage 606 may be implemented with a VAMD_SET or VAMD_OR instruction. In another form, stage 604 and 606 may together be implemented with a single VAMD_TSET instruction (test then set) followed by a conditional jump. In stage 607, the system also sets a TMW write-watch bit on the CLMD metadata for the TMW's cache line. Stage 607 may be implemented with a CLMD_SET or CLMD_OR instruction. The process ends at end point 612.

Figure 19:
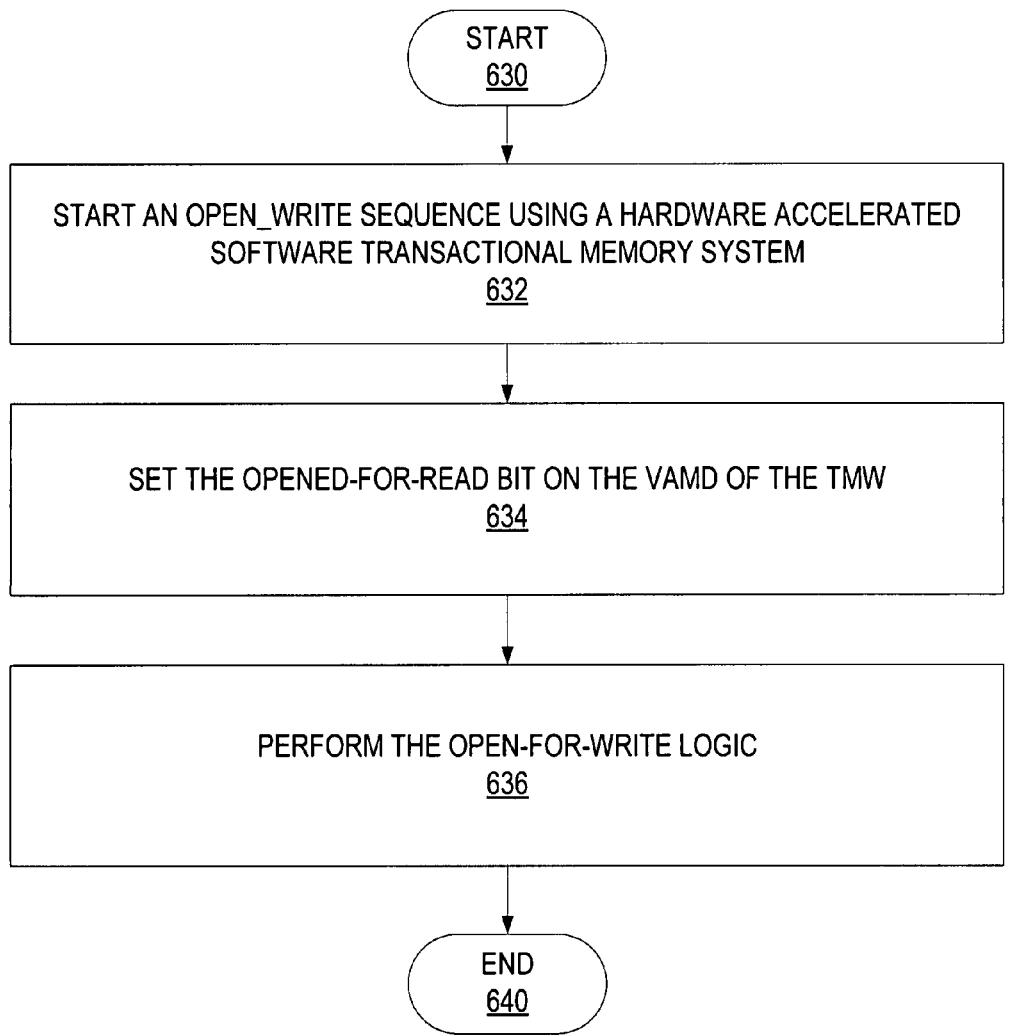
FIG. 19 is a process flow diagram for one implementation of the system of FIG. 1 that illustrates the stages involved in providing Open_Write barrier filtering that uses the TMW bit on the CLMD of the CPU cache.

FIG. 19 illustrates one implementation of the stages involved in an Open_Write barrier that complements the just described cache metadata based Open_Read filtering. In one form, the process of FIG. 19 is at least partially implemented in the operating logic of computing device 100. The process begins at start point 630 with the system starting an Open_Write sequence using a hardware accelerated software transactional memory system (stage 632). In one form, opening a TMW for write also grants read access. Therefore the system sets the opened-for-read bit on the VAMD of the TMW using the VAMD_SET instruction (stage 634). Then the system performs the transactional Open_Write logic (stage 636). For example, in one form, the TMW is overwritten with a pointer to this transaction object (indicating it owns the TMW's object(s) data for writing). In another form, the TMW is overwritten with a pointer to an entry in a transactional object write log. In either of these forms, a bit in the TMW is changed that indicates the TMW is opened for write by a transaction. The process ends at end point 640.

Figure 20:
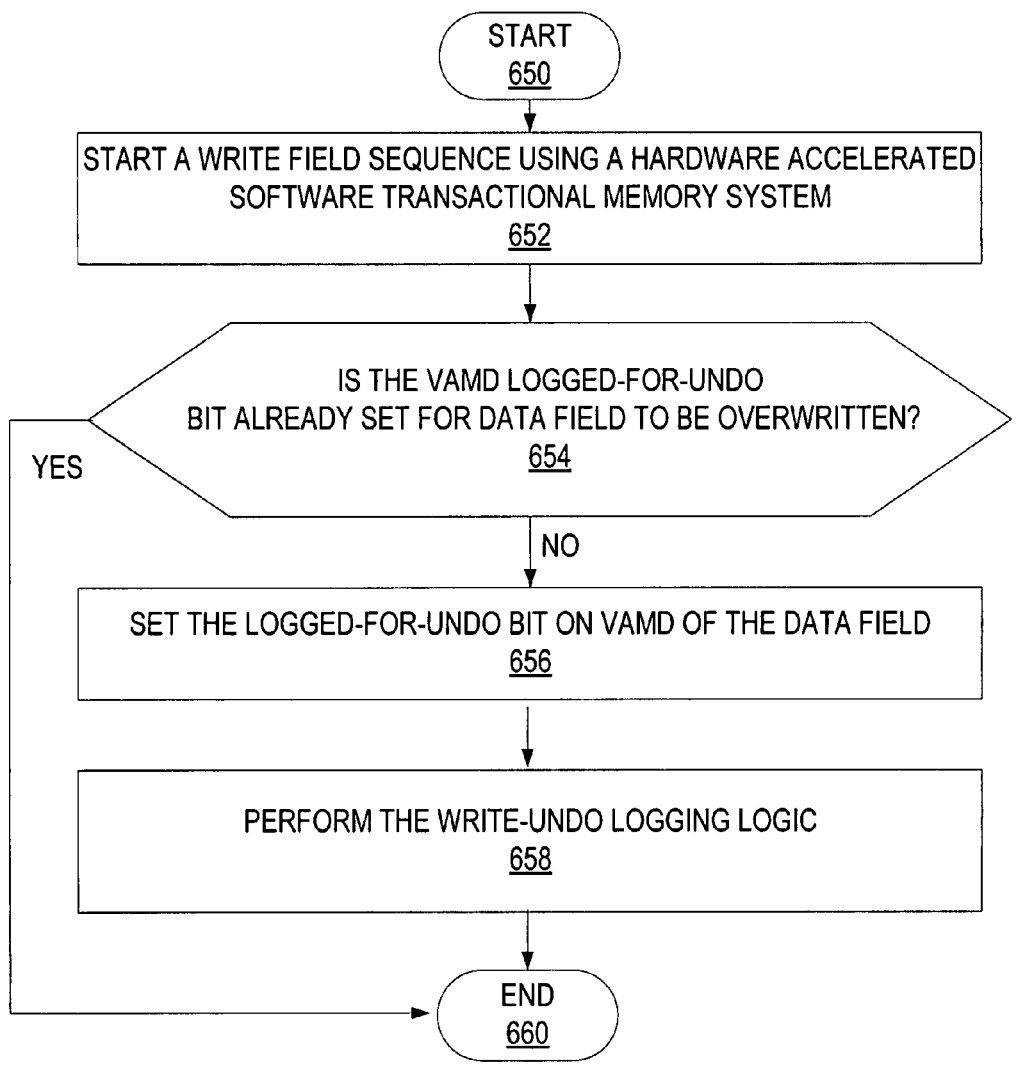
FIG. 20 is a process flow diagram for one implementation of the system of FIG. 1 that illustrates the stages involved in providing Write_Undo barrier filtering that uses the logged-for-undo bit to efficiently filter out redundant undo logging.

FIG. 20 illustrates one implementation of the stages involved in providing Write_Undo barrier filtering that uses a logged-for-undo bit position in the VAMD cache metadata to efficiently filter out redundant undo logging. In one form, the process of FIG. 20 is at least partially implemented in the operating logic of computing device 100. The process begins at start point 650 with the system starting a write field sequence using a hardware accelerated software transactional memory system (stage 652). If the VAMD logged-for-undo bit is already set for the address of the data field to be overwritten (decision point 654), then software jumps over the write undo logging sequence (stages 656, 658). Otherwise the system sets the logged-for-undo bit on the VAMD of the address of the data field (656) and performs Write_Undo logging logic (stage 658). In one form, the granularity of the VAMD metadata is per aligned quadword of data. Since that is the granularity of cache metadata based write undo filtering, therefore Write_Undo logging logic copies an aligned quadword of data to the log, even if the data field itself is smaller than a quadword. In one form, stage 654 may be implemented with a VAMD_TEST instruction followed by a conditional jump, and stage 656 may be implemented with a VAMD_SET or VAMD_OR instruction. In another form stage 654 and stage 656 may together be implemented with a single VAMD_TSET instruction (test then set) followed by a conditional jump. The process ends at end point 660.

Figure 21:
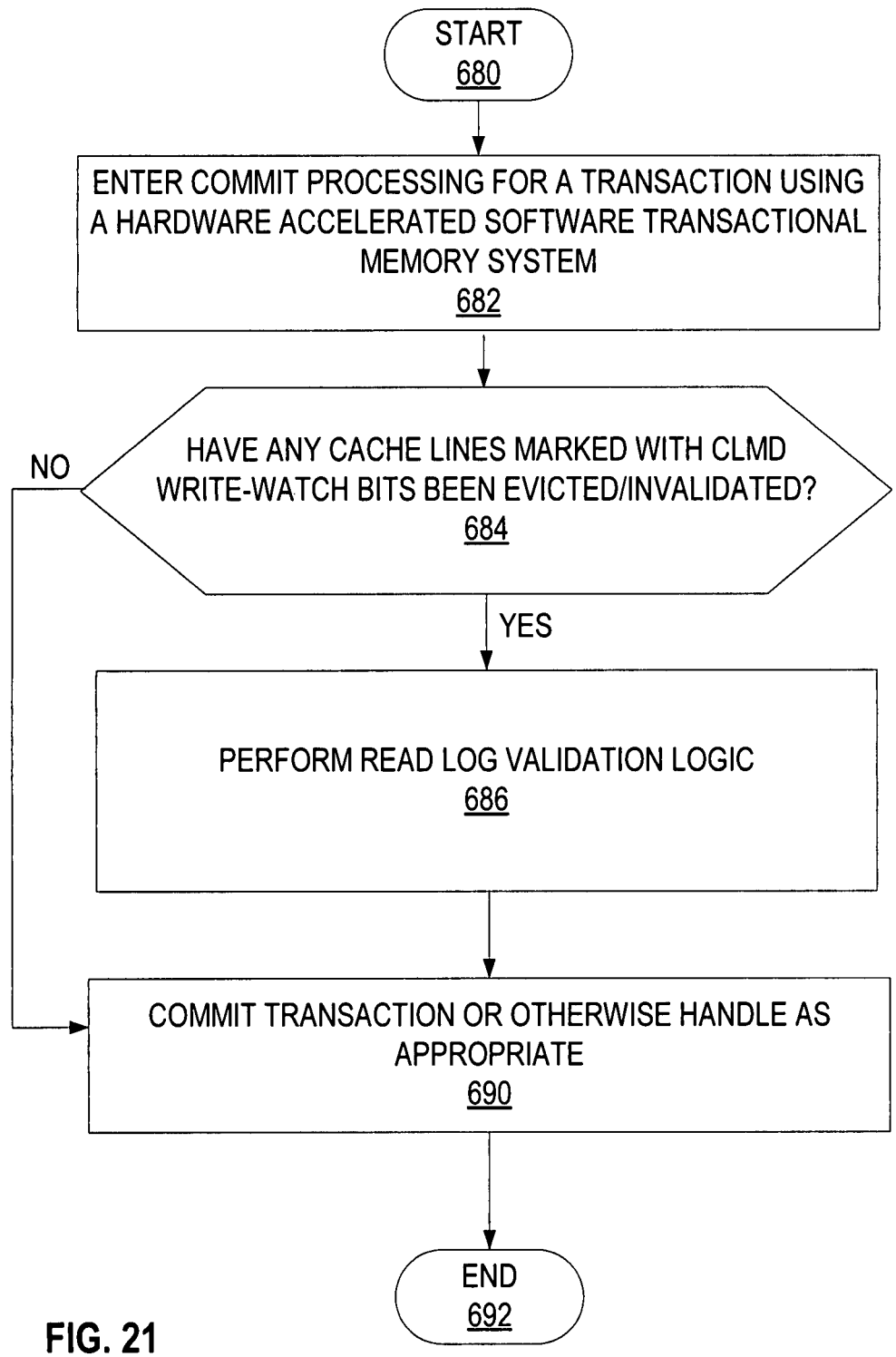
FIG. 21 is a process flow diagram for one implementation of the system of FIG. 1 that illustrates the stages involved in providing read log validation that uses the get CLMD evictions instruction on the CPU to avoid unnecessary read log validations.

FIG. 21 illustrates one implementation of the stages involved in providing read log validation that uses the GET_CLMD_EVICTIONS instruction to bypass read log validation when there have been no read set invalidations (e.g. no conflicting writes from other threads to data this transaction has read). In one form, the process of FIG. 21 is at least partially implemented in the operating logic of computing device 100. The process begins at start point 680 with the system entering commit processing for a transaction using a hardware accelerated software transactional memory system (stage 682). The system then checks whether any cache lines marked with the CLMD write-watch bit were evicted or invalidated while in this transaction. In one form, software issues the GET_CLMD_EVICTIONS instruction to retrieve the evictions summary and tests the write-watch bit; if it is zero, no watched line was evicted or overwritten by another thread. It follows this transaction's read set never suffered a conflicting write access from another thread, and it is safe to skip expensive read log validation. In that case, software conditionally jumps over the read log validation stage (stage 686). If the write-watch bit in the evictions summary is set, software performs read log validation (stage 686) as usual. In either event, the transactions are committed or otherwise handled as appropriate (stage 692). The process ends at end point 692.

Figure 22:
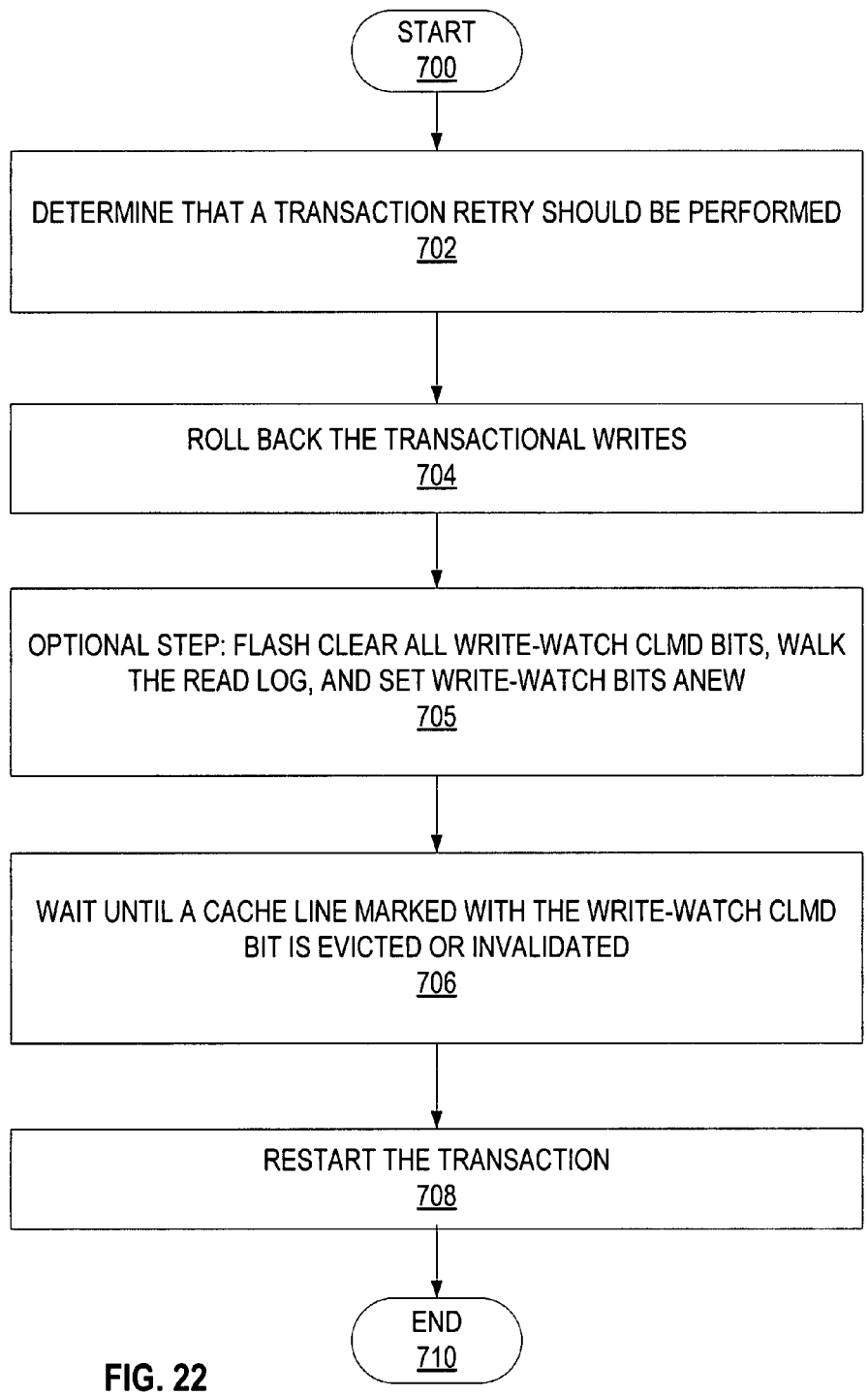
FIG. 22 is a process flow diagram for one implementation of the system of FIG. 1 that illustrates the stages involved in providing retry operations that mark CLMD lines.

FIG. 22 illustrates one implementation of the stages involved in providing retry operations that mark CLMD lines. In one form, the process of FIG. 22 is at least partially implemented in the operating logic of computing device 100. The process begins at start point 700 with determining that a transaction retry operation should be used in a hardware accelerated software transactional memory system (stage 702). The system rolls back updates to data written in the transaction and releases any data write locks it may hold (stage 704). The system then employs the CLMD write-watch bits previously set (stage 607) to reduce the overhead of waiting, and improve the latency of resuming, the transaction after another thread updates (writes) the data (stage 706). In one implementation it does this by polling the CLMD cache eviction using the GET_CLMD_EVICTIONS instruction to interrogate the evictions summary and then test for evictions of CLMDs. In another implementation software uses the CLMD_SET_EVICTION_HANDLER and CLMD_SET_EVICTION_HANDLER_MASK instructions to initialize the eviction handler to transfer program control to a retry-wakeup handler the moment a cache line with CLMD bit transaction-write is evicted or invalidated (written) by another thread. The thread can then be put to sleep, in one form via a spin-loop or in another by executing a pause instruction to enter a lower power state. When any write-watch-metadata annotated line is evicted or invalidated, the system then wakes up the waiting transaction and retries it again (stage 708). The process ends at end point 710. In another implementation, optional stage 705 may also be performed. Using CLMD_AND_ALL, software zeroes the write-watch bit position on all CLMDs in the cache metadata. Software then loops over every read log entry in the read log, re-establishing a write-watch CLMD bit on the cache line of the TMW address found in each read log entry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable medium storing computer-executable instructions for causing a computer to perform operations comprising:
    providing a hardware accelerated software transactional memory application that has access to metadata in a central processing unit (CPU) cache;
    determining that a retry operation should be used for a particular transaction of a processor;
    aborting the particular transaction at a current point, the aborting comprising rolling back updates in the particular transaction;
    putting the particular transaction to sleep in response to aborting the particular transaction by executing a pause instruction to enter a low power state;
    after the particular transaction is aborted, marking cache line metadata in the metadata corresponding to watched cache lines in the aborted particular transaction;
    waking up the particular transaction in response to another transaction evicting a marked cache line corresponding to the watched cache lines in the aborted transaction; and
    retrying the particular transaction.

2. The computer-readable medium of claim 1, wherein the particular transaction sleeps by establishing an eviction handler and where the particular transaction marks the cache line metadata such that eviction will cause a control flow transfer to the eviction handler.

3. The computer-readable medium of claim 1, the operations further comprising:
    providing a hardware acceleration mechanism to filter redundant execution of an operation used by the hardware accelerated software transactional memory application; and
    providing write undo barrier filtering that uses a logged-for-undo bit that is contained in the metadata in the CPU cache, the write undo barrier filtering comprising:
        starting a write field sequence for a data field to be overwritten; and
        skipping a write undo logging sequence if the logged-for-undo bit contained in the metadata is set for a virtual address of the data field to be overwritten.

4. The computer-readable medium of claim 3, wherein the hardware accelerated software transactional memory application uses an opened-for-read bit wherein a first execution of an open-for-read operation enables a subsequent execution of an open-for-read operation to be filtered out as redundant.

5. The computer-readable medium of claim 3, wherein the write undo barrier filtering is operable to use the logged-for-undo bit to determine whether redundant logging can be avoided.

6. The computer-readable medium of claim 5, wherein if the logged-for-undo bit is not set for the particular virtual address, set the logged for undo bit to true.

7. The computer-readable medium of claim 6, wherein if the logged-for-undo bit is not set for the particular virtual address, also log data associated with the logged-for-undo bit.

8. The computer-readable medium of claim 3, wherein a first execution of an operation makes a subsequent execution of an operation redundant.

9. The computer-readable medium of claim 8, the operations further comprising:
    accessing a metadata bit to determine whether or not an earlier execution of an operation may have been performed;
    if the metadata bit is set, then avoiding a redundant operation;
    if the metadata bit is not set, then executing the operation; and
    if the operation makes a subsequent operation redundant, then setting the metadata bit to reflect this.

10. The computer-readable medium of claim 9, wherein the metadata bit is a cache metadata bit associated with an address on which an operation is being attempted.

11. The computer-readable medium of claim 1, wherein the CPU cache is associated with multiple logical processors.

12. A method for performing a retry operation using a hardware accelerated software transactional memory application comprising the operations of:
    providing the hardware accelerated software transactional memory application that has access to metadata in a cache of a central processing unit;
    determining that the retry operation should be used for a particular transaction of a processor;
    aborting the particular transaction at a current point, the aborting comprising rolling back updates in the particular transaction;
    putting the particular transaction to sleep in response to aborting the particular transaction by executing a pause instruction to enter a low power state;
    after the particular transaction is aborted, marking cache line metadata in the metadata corresponding to watched cache lines in the aborted particular transaction;
    waking up the particular transaction in response to another transaction evicting a marked cache line corresponding to the watched cache lines in the aborted transaction; and
    retrying the particular transaction.

13. The method of claim 12, further comprising:
    waiting until another processor changes something the particular transaction had read.

14. The method of claim 13, wherein the particular transaction sleeps by establishing an eviction handler and where the particular transaction marks the cache line metadata such that eviction will cause a control flow transfer to the eviction handler.

15. A computer system comprising:
    a central processing unit (CPU) including a plurality of logical processors;
    a CPU cache including:
        a plurality of cache lines, and
        cache line metadata corresponding to each cache line; and
    a computer-readable medium storing computer-executable instructions for causing the CPU to perform operations comprising:
        providing a hardware accelerated software transactional memory application that has access to the cache line metadata;
        determining that a retry operation should be used for a particular transaction of the CPU;
        aborting the particular transaction at a current point, the aborting comprising rolling back updates in the particular transaction;
        putting the particular transaction to sleep in response to aborting the particular transaction by executing a pause instruction to enter a low power state;
        after the particular transaction is aborted, marking cache line metadata in the metadata corresponding to watched cache lines in the aborted particular transaction;
        waking up the particular transaction in response to another transaction evicting a marked cache line corresponding to the watched cache lines in the aborted transaction; and
        retrying the particular transaction.

16. The computer system of claim 15, wherein the particular transaction sleeps by establishing an eviction handler and where the particular transaction marks the cache line metadata such that eviction will cause a control flow transfer to the eviction handler.

17. The computer system of claim 15, the operations further comprising:
    providing a hardware acceleration mechanism to filter redundant execution of an operation used by the hardware accelerated software transactional memory application; and
    providing write undo barrier filtering that uses a logged-for-undo bit that is contained in the cache line metadata, the write undo barrier filtering comprising:
        starting a write field sequence for a data field to be overwritten; and
        skipping a write undo logging sequence if the logged-for-undo bit contained in the cache line metadata is set for an address of the data field to be overwritten.

18. The computer system of claim 17, the operations further comprising:
    accessing a metadata bit to determine whether or not an earlier execution of an operation may have been performed;
    if the metadata bit is set, then avoiding a redundant operation;
    if the metadata bit is not set, then executing the operation; and
    if the operation makes a subsequent operation redundant, then setting the metadata bit to reflect that the subsequent operation is redundant.

19. The computer system of claim 1, wherein the software transactional memory application uses an opened-for-read bit wherein a first execution of an open-for-read operation enables a subsequent execution of an open-for-read operation to be filtered out as redundant.

* * * * *